(12) United States Patent
Ripberger

(10) Patent No.: US 8,683,103 B2
(45) Date of Patent: *Mar. 25, 2014

(54) HIERARCHICAL MULTI-TENANCY SUPPORT FOR HOST ATTACHMENT CONFIGURATION THROUGH RESOURCE GROUPS

(75) Inventor: Richard A. Ripberger, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 259 days.

This patent is subject to a terminal disclaimer.

(21) Appl. No.: 13/214,129

(22) Filed: Aug. 19, 2011

(65) Prior Publication Data

US 2013/0046906 A1  Feb. 21, 2013

(51) Int. Cl.
*G06F 3/00* (2006.01)
*G06F 5/00* (2006.01)
*G06F 13/368* (2006.01)

(52) U.S. Cl.
USPC ............... 710/120; 710/10; 710/12; 710/36; 710/37; 710/8; 710/42

(58) Field of Classification Search
USPC ............................ 710/8, 36, 42, 10, 12, 37
See application file for complete search history.

(56) References Cited

U.S. PATENT DOCUMENTS

| | | | |
|---|---|---|---|
| 5,983,270 A * | 11/1999 | Abraham et al. | 709/224 |
| 7,657,613 B1 | 2/2010 | Hanson et al. | |
| 2004/0098383 A1* | 5/2004 | Tabellion et al. | 707/3 |
| 2005/0114624 A1* | 5/2005 | Cervantes et al. | 711/206 |
| 2005/0149676 A1* | 7/2005 | Shimada et al. | 711/114 |
| 2006/0171381 A1* | 8/2006 | Benner et al. | 370/386 |
| 2010/0251252 A1 | 9/2010 | Laverone et al. | |

OTHER PUBLICATIONS

"Method to Manage Access Control of Multiple LAN Server 1.2 and 1.3 Resources with a Single OS/2 Command," IBM Technical Disclosure Bulletin, Apr. 1992, vol. 34, Issue 11, pp. 167-168, Apr. 1, 1992.*

* cited by examiner

*Primary Examiner* — Farley Abad
(74) *Attorney, Agent, or Firm* — Griffiths & Seaton PLLC

(57) ABSTRACT

Exemplary system and computer program embodiments for hierarchy multi-tenancy support for configuration of a plurality of host attachment through a plurality of resource groups in a computing storage environment are provided. In one embodiment, multiple data storage subsystems are configured with multiple operators for configuration and management of multiple host attachments to multiple logical volumes. A logical operator is designated with the responsibility of designating authority to a host attachment operator and the ability to configure multiple logical volumes. Limited authority is provided for the host attachment operator to configure multiple volume groups and multiple host ports to a specific user.

12 Claims, 14 Drawing Sheets

HIERARCHICAL MULTI-TENANCY SUPPORT FOR HOST ATTACHMENT CONFIGURATION THROUGH RESOURCE GROUPS

BACKGROUND OF THE INVENTION

1. Field of the Invention

The present invention relates in general to computers, and more particularly to apparatus computer program product embodiments of hierarchy multi-tenancy support for configuration of a plurality of host attachment through a plurality of resource groups in a computing storage environment.

2. Description of the Related Art

Computers and computer systems are found in a variety of settings in today's society. Computing environments and networks may be found at home, at work, at school, in government, and in other settings. Computing environments increasingly store data in one or more storage environments, which in many cases are remote from the local interface presented to a user.

These computing storage environments may use many storage devices such as disk drives, often working in concert, to store, retrieve, and update a large body of data, which may then be provided to a host computer requesting or sending the data. In some cases, a number of data storage subsystems are collectively managed to provide storage for a number of host systems. Each host system provides one or more host logical partitions that are each capable of running an operating system that supports running one or more applications. Each host logical partition is allowed to access certain storage devices on the data storage subsystems. In this way, a general purpose computing environment allows the processing and storage resources of the configuration to be partitioned and assigned to various workloads associated with one or more applications. In some environments, a set of workloads may be associated with a specific tenant that is using a subset of the computing environment such that there may be multiple tenants that are concurrently running on various subsets within the environment. In this way, a general-purpose multi-host system and multi-storage system-computing environment can be configured to support multi-tenancy or multiple workloads.

In some situations, data storage is provided locally and also provided to a remote storage environment to enhance data reliability by providing redundancy. In these situations, several instances of data may be stored in multiple locations to provide for failsafe recovery. Storage environments such as network attached storage (NAS) and storage area networks (SAN) allow for these implementations, and for the implementation and maintenance of a larger amount of storage. SAN, NAS and similar systems are increasingly used for supplying a variety of services, such as email, database, applications, and other services. Data storage subsystems also are increasingly supporting the ability to perform outboard replication across SANs, LANs, and WANs to facilitate the replication of data for backup or mirroring purposes.

SUMMARY OF THE DESCRIBED EMBODIMENTS

Most computing environments have configurable attributes that are managed through a user interface. The user interface typically provides a mechanism to authenticate the user through mechanisms such as a user ID and a password. Different users may have different roles such as an administrator, operator, general user, etc. In a system that provides virtualization of resources, logical resources are typically configured from physical resources. The logical resources can be managed within the system via the creation and manipulation of objects in a database that represent the logical resources. As such, when a user creates a logical resource, the system remembers that the logical resource exists by creating an object in the database that has attributes that define the logical resource and may also designate the physical resources associated with that object.

As an example of the above description, a storage controller in a computing storage environment may provide for the creation of logical volumes that are accessible by host systems which are created from storage capacity that is available to the storage controller on attached storage devices such as disks or redundant array of independent disk (RAID) arrays. A user creates a logical volume with a given capacity and using a particular type of physical storage through the user interface and the system implementation is such that the logical volume's host address, capacity, and physical storage type are represented in a data structure whose template is defined by a logical volume class and a given instance of this template is referred to as an instance or object of the logical volume class.

In general, it is desirable to provide some mechanism to allow specific users to have access to specific subsets of the configuration classes or specific subsets of the objects within a configuration class in the system configuration. Referring again to the above example, a set of users (A) may be designated to manage the logical volumes created on the storage controller which are to be accessed by a given set of host systems (a). A different set of users (B) may be designated to manage the logical volumes created on the storage controller that are to be a accessed by a second set of host systems (b). It is desirable that the configuration methods of the system provide mechanisms to prevent users in user set (A) from affecting logical volumes that are associated with user set (B) and vice versa.

In addition, within the computing environment, users have requirement needs to allow configuration of storage subsystems to be performed by a hierarchy of administrators where specific administrators are responsible for configuring specific functions. Moreover, the users requirement needs may also exist within the constraints of a multi-tenancy environment where it is desirable for each tenant to be able to have their own hierarchy of administrators. As such, a general-purpose mechanism is desired to partition resources between specific administrators and to limit those administrators to specific roles.

To facilitate the arbitrary partitioning storage controller resources into management subsets, the configuration objects within a given object class may be associated with an object that represents a manageable collection of storage controller resources that will hereafter be referred to as a resource group. The resource group object may also have other attributes that specify one or more management policies to be applied to the resources assigned to the resource group. For example, there might be one or more logical volumes associated with a resource group, and there might be an attribute in the resource group that indicates that the logical volumes associated with the resource group are not allowed to be used as the target of a copy operation between two volumes. Having created appropriate resource groups with associated resources and policies, it is then possible to designate specific users to have authority to manage specific resource groups.

It is further desirable that such configurations are organized such that specific users may be defined to have authority to manage resources within a limited set of resource groups and to reassign resources within that limited set of resource groups. Additionally, it is desirable that the configuration methods provide a way to authorize specific users to create new resource groups that can be used to further sub-set storage resources within their scope of management such that the new resource groups are constrained to have policies that are at least as restrictive as the resource groups from which storage resources are going to be relocated from. It is further desirable to authorize specific users to have the authority to create user IDs which are constrained to have authority and access scope which is at least as restrictive as the creating user ID's authority. With these capabilities, a multi-level management hierarchy can be created where an individual user at a given level has the ability to sub-divide the resources of that level into additional sub-levels and create user IDs to mange the sub-levels such that the management policies and scope of access applied at any given sub-level is at least as restrictive at the next higher level of the hierarchy. In a multi-tenancy environment, the highest level can be used to partition the computing environment between the individual tenants and the administrative user IDs assigned to the tenant can take further action to create a management hierarchy for the tenant that is limited to the resources and by the policies established at the highest level.

Accordingly, and in view of the foregoing, various system, method, and computer program product embodiments for hierarchy multi-tenancy support for configuration of a plurality of host attachment through a plurality of resource groups in a computing storage environment are provided. In one embodiment, by way of example only, multiple data storage subsystems are configured with multiple operators for configuration and management of multiple host attachments to multiple logical volumes. A logical operator is designated with the authority to configure multiple logical volumes within their scope of authority and a mechanism of designating responsibility for configuring host attachments for these logical volumes to one or more host attachment operators. A host attachment operator is designated with the authority to configure multiple volume groups and multiple SCSI host ports for a set of logical volumes within their scope of authority.

In one embodiment, each storage resource is represented by a resources object having a resource group attribute associating the storage resource with one of the plurality of resource groups, each represented by a resource group object. A resource group label attribute is defined for the resource group object. Additional attributes of the resource group object that specify a plurality of management policies for the resource group object and the storage resources associated with the resource group object are defined. One of plurality of available users of the storage resources is associated with a user resource scope attribute. A schema is defined for comparing of a plurality of values of the user resource scope attribute with the resource group label attribute, wherein the at least one of the plurality of available users having authority to perform one of creating, modifying, delete, and managing the storage resources associated with the at least one of the plurality of resource groups and also authority to perform one of creating and modifying at least one of the plurality of resource groups.

The authority to manage at least one of the plurality of resource groups can then be arbitrarily assigned to at least one user of the multiple users via configuration of a user resource scope attribute associated with the user account. Only those of the multiple users assigned a user resource scope that selects at least one of the plurality of resource groups are authorized to perform a management task on the objects assigned to the selected resource groups. In one embodiment, the resource scope is a text sting that specifies a pattern such that a given resource group is within the scope of the resource scope if the pattern in the resource scope matches the string in the resource group label of the resource group.

In addition to the foregoing exemplary embodiment, various other system and computer program product embodiments are provided and supply related advantages.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
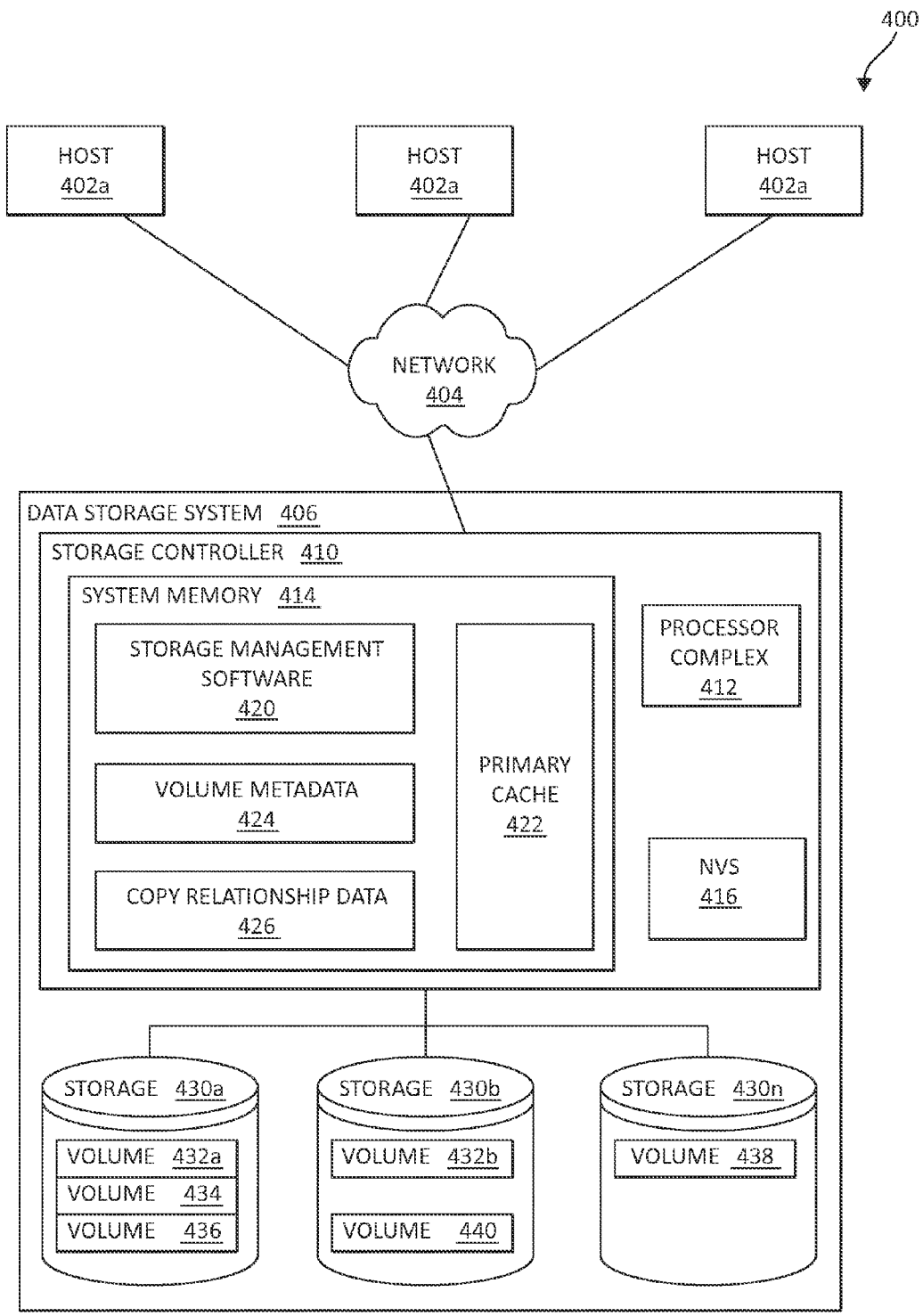
FIG. 1 is a block diagram illustrating a portion of an exemplary computing storage environment.

In reference to FIG. 1, one exemplary embodiment 400 of a computing environment including a data storage system 406 is illustrated in block diagram form and represents an exemplary computing environment for implementing the methods described herein. A network 404 connects one or more hosts 402 with a data storage system 406. Data storage system 406 receives input/output requests for writing/reading data from hosts 402, also referred to herein as a "write request" and "read request," and thereby serves as a networked storage resource for hosts 402. In one embodiment, data storage system 406 is implemented as IBM® System Storage™ DS8000™. Network 404 may be a fibre channel fabric, a fibre channel point to point link, a fibre channel over ethernet fabric or point to point link, a FICON or ESCON I/O interface, any other I/O interface type, a wireless network, a wired network, a LAN, a WAN, heterogeneous, homogeneous, public (i.e. the Internet), private, or any combination thereof. Hosts 402 may be local or distributed among one or more locations and may be equipped with any type of fabric or network adapter (not shown in FIG. 1) to network 404, such as Fibre channel, FICON, ESCON, Ethernet, fiber optic, wireless, or coaxial adapters. Data storage system 406 is accordingly equipped with a suitable fabric or network adapter (not shown in FIG. 1) to communicate via network 404. Data storage system 406 is depicted in FIG. 1 comprising storage controller 410 and storage 430.

To facilitate a clearer understanding of the methods described herein, storage controller 410 is shown in FIG. 1 as a single processing unit, including processor complex 412, system memory 414 and nonvolatile storage ("NVS") 416, which will be described in more detail below. It is noted that in some embodiments, storage controller 410 is comprised of multiple processing units, each with their own processor complex and system memory, and interconnected by a dedicated network within data storage system 406. Storage 430 may be comprised of one or more storage devices, such as storage arrays, which are connected to storage controller 410 by a storage network.

In some embodiments, the devices included in storage 430 are connected in a loop architecture. Storage controller 410 manages storage 430 and facilitates the processing of write and read requests intended for storage 430. The system memory 414 of storage controller 410 stores program instructions and data which processor complex 412 may access for executing functions and method steps associated with managing storage 430. In one embodiment, system memory 414 includes storage management software 420 for executing storage management functions, including the methods and operations described herein. In some embodiments, system memory 414 is allocated for storing volume metadata 424 and copy relationship data 426, which are used for implementing certain virtualization mechanisms, described further below. As shown in FIG. 1, system memory 414 may also include a primary cache 422 for storage 430, also referred to herein as a "cache memory", for buffering "write data" and "read data", which respectively refer to write/read requests and their associated data. In one embodiment, primary cache 422 is allocated in a device external to system memory 414, yet remains accessible by processor complex 412 and serves to provide additional security against data loss, as will be described in detail with respect to FIG. 2 below.

In some embodiments, primary cache 422 is implemented with a volatile memory and coupled to processor complex 412 via a local bus (not shown in FIG. 1) for enhanced performance of data storage system 406. The NVS 416 included in data storage controller is accessible by processor complex 412 and serves to provide additional security against data loss, as will be described in detail with respect to FIG. 2 below by maintaining a second copy of any data resident in the write cache portion of the primary cache. In a typical redundant storage controller configuration where there are two processor complexes, each with a primary cache and an NVS, each processor complex manages the data for one half of the logical volumes such that the read/write cache data is stored in the locally attached primary cache and the second copy of the write data is maintained in the remote processor complexes NVS. As such, the data is immune to a processor complex failure (because the other processor complex has a copy of any write data that has not been written to disk. The data is also immune to a power loss in that the NVS is non-volate and at least one copy of the data (on each processor complex) will survive a power loss. NVS 416, also referred to as a "non-volatile storage", is implemented with nonvolatile memory that may or may not utilize external power to retain data stored therein. In some embodiments, a backup power source (not shown in FIG. 1), such a battery, supplies NVS 416 with sufficient power to retain the data stored therein in case of power loss to data storage system 406. In certain embodiments, the capacity of NVS 416 is less than the total capacity of primary cache 422.

Storage 430 may be physically comprised of one or more storage devices, such as storage arrays. A storage array is a logical grouping of individual storage devices, such as a hard disk. In certain embodiments, storage 430 is comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical volumes, which define the storage location specified in a write/read request.

As shown in FIG. 1, a logical volume, or simply "volume," may have different kinds of allocations. Storage 430a, 430b and 430n are shown as ranks in data storage system 406, and are referred to herein as rank 430a, 430b and 430n. Ranks may be local to data storage system 406, or may be located at a physically remote location. In other words, a local storage controller may connect with a remote storage controller and manage storage at the remote location. Rank 430a is shown configured with two entire volumes, 434 and 436, as well as one partial volume 432a. Rank 430b is shown with another partial volume 432b. Thus volume 432 is allocated across ranks 430a and 430b. Rank 430n is shown as being fully allocated to volume 438—that is, rank 430n refers to the entire physical storage for volume 438. From the above examples, it will be appreciated that a rank may be configured to include one or more partial and/or entire volumes. Volumes and ranks may further be divided into so-called "tracks," which represent a fixed block of storage. A track is therefore associated with a given volume and a given rank.

As mentioned previously, one kind of virtualization mechanism that may be implemented on data storage system 406 is a copy relationship. In a copy relationship, data on one rank may be automatically copied to another rank so that access to data volumes can be provided from two different sources. In one embodiment, a copy relationship involves a physical point-in-time copy operation, in which all the data from source volumes to target volumes are physically copied so that the target volume has a copy of the data as of a point-in-time. In some embodiments, a copy relationship involves a logical point-in-time copy operation, in which a logical copy of the source volume is made, after which data are only copied over when necessary. The logical copy relationship provides the advantageous effect of deferring the physical copying, and is performed to minimize the time during which the target and source volumes are inaccessible.

One example of a copy relationship is known as FlashCopy®. FlashCopy® involves establishing a logical point-in-time relationship between source and target volumes on different ranks. Once the copy relationship is established, hosts may then have immediate access to data on the source and target volumes, and the data may be copied as part of a background operation. Any new modification of data to tracks on the source rank cause those modified tracks on the source rank to be written to the target rank. Reads to any tracks in the cache that have not been updated with modified data from the source causes the source track to be staged to the cache before access is provided to the track from the cache. It is noted that write data associated with or transferred as a result of a copy relationship are referred to herein as being "involved" in a copy relationship. Information about the logical tracks of a copy relationship is stored in volume metadata 424.

Figure 2:
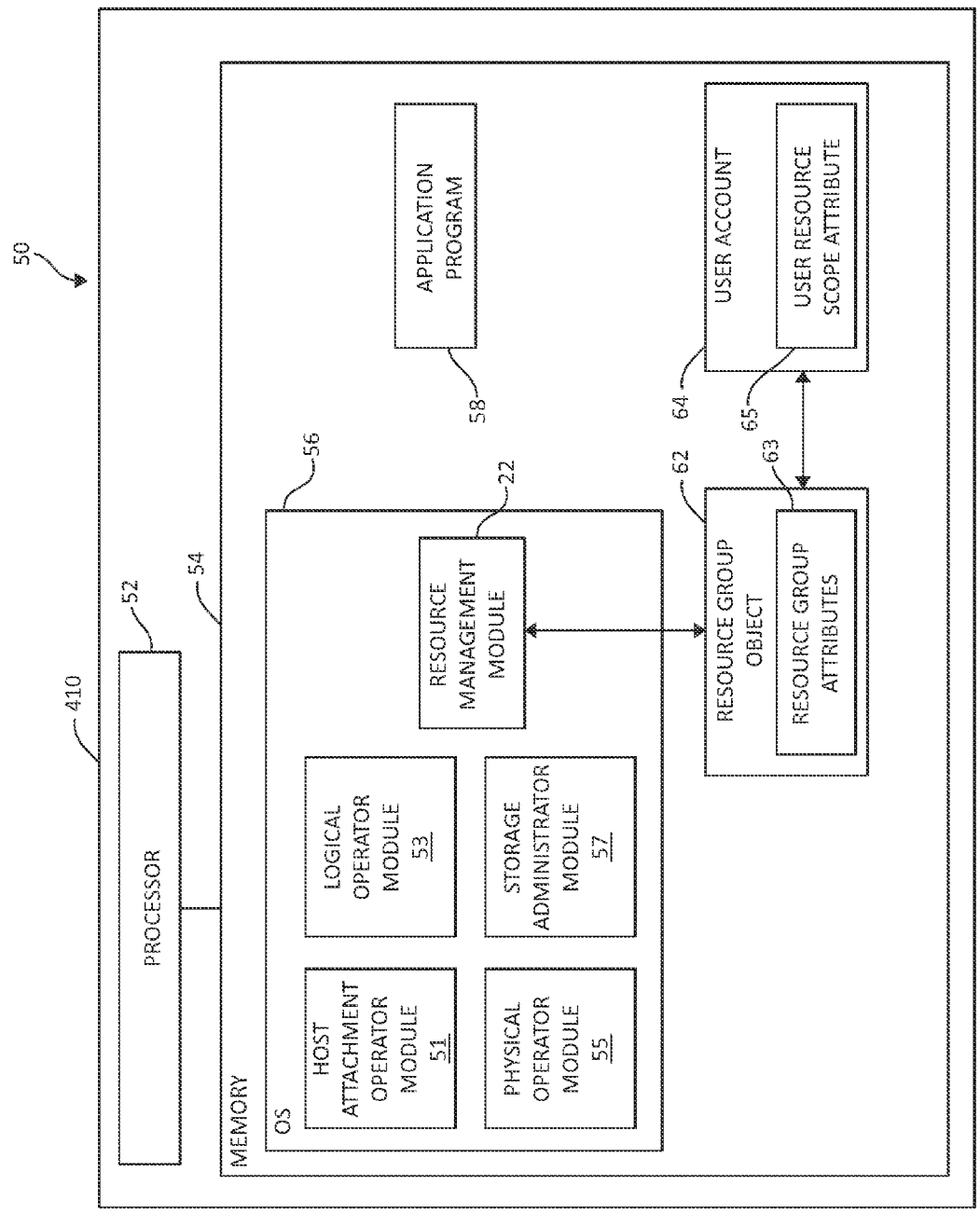
FIG. 2 is a block diagram illustrating an exemplary portion of storage controller 410 of the exemplary computing storage environment depicted in FIG. 1.

Turning now to FIG. 2, an exemplary portion of a storage controller 410 as also seen in FIG. 1, previously, is illustrated. Portion 410 of storage controller 410 (FIG. 1) is operable in a computer environment as a portion thereof, in which mechanisms of the following illustrated embodiments may be implemented. It should be appreciated, however, that FIG. 2 is only exemplary and is not intended to state or imply any limitation as to the particular architectures in which the exemplary aspects of the various embodiments may be implemented. Many modifications to the architecture depicted in FIG. 2 may be made without departing from the scope and spirit of the following description and claimed subject matter.

In the illustrated embodiment, portion 410 includes a processor 52 and a memory 54, such as random access memory (RAM). The portion 410 may be operatively coupled to several components not illustrated for purposes of convenience, including a display, which presents images such as windows to the user on a graphical user interface, a keyboard, mouse, printer, and the like. Of course, those skilled in the art will recognize that any combination of the above components, or any number of different components, peripherals, and other devices, may be used with the portion 410.

In the illustrated embodiment, the portion 410 operates under control of an operating system (OS) 56 (e.g. z/OS, OS/2, LINUX, UNIX, WINDOWS, MAC OS) stored in the memory 54, and interfaces with the user to accept inputs and commands and to present results. In one embodiment of the present invention, the OS 56 facilitates management partitioning functionality according to the present invention. To this end, OS 56 includes a resource group manager (or may be referred to as the resource management module or resource manager) 22 as previously described, which may be adapted for carrying out various processes and mechanisms in the exemplary methods described following.

The resource management module 22, host attachment operator module 51, a logical operator module 53, a physical operator module 55, and storage administrator module 57 program may be written in a programming language such as COBOL, PL/1, C, C++, JAVA, ADA, BASIC, VISUAL BASIC or any other programming language to be translated into code that is readable by the processor 52.

Data structures 62 and 64 (resource group object 62, and user account 64, respectively) are shown interactional with the resource group manager 22 in memory 54. Data structure 62 includes one or more resource group attributes 63 (such as a resource group number, a resource group label, and other resource group policy attributes as will be further described). Data structure 64 includes one or more user account attributes 64 (such as a user identification (ID), password, and a user resource scope (URS) as will be further described). A portion of the functionality of the resource group manager 22 is, in one embodiment, to correlate the data structures 62 assigned to a particular storage resource(s), including resource group attributes 63 previously described, and data structures 64 assigned to a particular user account, including the user account attributes 65 previously described.

The present invention provides the support of new or additional user roles that are intended to support a layer in the storage management hierarchy that is responsible for only the configuration of host attachments to logical volumes on the storage facility. Thus, the present invention is configured with a host attachment operator module 51, a logical operator module 53, a physical operator module 55, and a storage administrator module 57 communicating and working in conjunction with the data structures 62 and 64.

To further implement and execute mechanisms and processes according to the present invention, OS 56, in conjunction with the resource management module 22, memory 54, processor 52, data structures 62 and 64, host attachment operator module 51, a logical operator module 53, a physical operator module 55, storage administrator module 57, and other computer processing, networking, and storage components, may implement management partitioning mechanisms according to the present invention as will be further described. As one of ordinary skill in the art will appreciate, the mechanisms implemented by the resource management module 22, host attachment operator module 51, logical operator module 53, physical operator module 55, and storage administrator module 57 as presently illustrated may be implemented in various forms and architectures. Accordingly, the illustration of resource management module 22 (as well as data structures 62 and 64), host attachment operator module 51, a logical operator module 53, a physical operator module 55, and the storage administrator module 57, in the present figure is again intended to demonstrate logical relationships between possible computing components in the 410, and not to imply a specific or limiting physical structure or relationship.

In one embodiment, instructions implementing the operating system 56, resource management module 22, host attachment operator module 51, a logical operator module 53, a physical operator module 55, storage administrator module 57, are tangibly embodied in a computer-readable medium, which may include one or more fixed or removable data storage devices, such as a zip drive, disk, hard drive, DVD/CD-ROM, digital tape, solid state drives (SSDs), etc. Further, the operating system 56 and the resource management module, host attachment operator module 51, a logical operator module 53, a physical operator module 55, storage administrator module 57, comprise instructions which, when read and executed by the computing storage environment to perform the steps necessary to implement and/or use the present invention. The resource management module 22, host attachment operator module 51, a logical operator module 53, a physical operator module 55, storage administrator module 57, and/or operating system 56 instructions may also be tangibly embodied in the memory 54 and/or transmitted through or accessed by networks attached to the storage controller (not shown) via various components. As such, the terms "article of manufacture," "program storage device" and "computer program product" as may be used herein are intended to encompass a computer program accessible and/or operable from any computer readable device or media.

Embodiments of the present invention may include one or more associated software application programs 58 that include, for example, functions for managing a distributed computer system comprising a network of computing devices, such as a SAN or NAS as previously described. Accordingly, processor 52 may comprise one or more storage management processors (SMP). The program 58 may operate within a single computer and/or storage controller 410 or as part of a distributed computer system comprising a network of computing devices. The network may encompass one or more computers connected via a local area network and/or Internet connection (which may be public or secure, e.g. through a virtual private network (VPN) connection), or via a fibre channel SAN or other known network types as will be understood by those of ordinary skill in the art or via proprietary interconnection network that is defined by a given vendor to integrate components comprising a distributed computer system. As one of ordinary skill in the art will appreciate, the storage controller portion 410 may comprise computing components visible throughout the distributed computer system, such as components conforming to a lightweight directory access protocol (LDAP). In this manner, the data structure 64 may be listed in an LDAP server, for example.

The storage controller 410 may, in one embodiment, be adapted to define user accounts (having data such as the aforementioned user IDs (user ID), password, user resource scope), and provides a mechanism for the storage administrator to assign a particular user role and user resource scope to the user account. The functionality of the resource group label and resource scope attributes in relation to the present invention and claimed subject matter will now be further described in more detail.

Each storage resource may be associated with a resource group. Each storage resource object and configuration object or class that can be associated with a resource group object has a resource group attribute that contains the resource group number of its associated resource group. The resource group object may have other attributes that define policies relative to how the resources in the resource group can be managed. The resource group object, in turn, may have a resource group label attribute that contains a unique identifier for the resource group. In one embodiment, the resource group label is a text string that is semantically structured to allow hierarchical relationships between the resource groups. The user account information (such as the user ID, for example), in turn, may have a user resource scope attribute that contains a resource scope that can be used to test whether the user has access to a given resource group. The resource scope may be implemented with a similar semantic structure as a resource group label, except that it may contain "wildcard" characters. As such the resource scope specifies a pattern that can be match to the set of resource group labels allowing the resource scope to select a specific subset of the hierarchy of resource groups.

While the following exemplary embodiment of a resource scope and resource group label implementation incorporates the text string previously mentioned, it will be apparent to one of ordinary skill in the art that the semantic structure of the string (or a different implementation entirely) is possible. The following exemplary embodiment "A" may be used to support varying hierarchical relationships between users as will be further explained. In this exemplary embodiment, the slash and the period are used as delimiters. The asterisk (*) is used as a "wild card." A token is defined as at least a portion of the text string that may contain any printable characters other than delimiters or the asterisk (*).

In the embodiment A, the resource group label is a text string including one or more parts separated by a slash delimiter. Each part is called a resource group qualifier. A resource_group qualifier may be null or consist of one or more tokens separated by a period. At least one resource group qualifier must be non-null. Consider the following examples of resource group labels:

| A    | /vol      | A.B.C/vol1              |
|------|-----------|-------------------------|
| A.23 | a123/vol1 | A1.B2.test/C.d.vol/D/E  |

Again referring to exemplary embodiment A, the user resource scope is a text string consisting of one or more parts separated by a slash delimiter. Each part is called a resource scope qualifier. A resource_scope qualifier may be null or consist of one or more tokens separated by a period. At least one resource scope qualifier must be non-null. In addition the last character of the last token of a resource scope qualifier may be an asterisk (*). Consider the following examples of resource scopes:

| *              | /*     | */*   | a*/v*     | A1.B2.te*/C.d.vol |
|----------------|--------|-------|-----------|-------------------|
| A1.B2.text/C.d* | A*/C*  | a123/vol1 | A.B.C/vol1 |
| A1.B2.test/C.d.vol | A/B/C | A//C  |           |                   |

In one embodiment, by way of example only, when a user with a particular assigned user resource scope (URS) creates a storage resource in the system configuration, the storage resource must be assigned to a resource group whose resource group label (RGL) attribute matches the requesting user's URS attribute value. For example if the user's URS is "IBM*", the user could associate the storage resource he creates with any configured resource group whose RGL matches the "IBM*". RGLs that match "IBM*" include, but are not limited to, "IBM", "IBM123", "IBM.AIX.System3.DB2.Pool3" etc. Once the resource is created, the system ensures that only user IDs that have a user resource scope that matches the RGL attribute value in the resource group associated with a given storage resource are allowed to modify, control, or delete the object representing the storage resource according to the management task to be performed.

In one embodiment, when there is more than one resource group qualifier in a resource group label, each respective resource scope qualifier must match the respective resource group qualifier in order for the resource scope pattern to be considered a match to the resource group label. In this definition, the wild card (asterisk) does not span across a slash delimiter unless it the last character of the resource scope. For example, while A.*/v* matches A.B/v1 or A.B/v1/C, it does not match A.B/C/v1. This refinement removes certain ambiguities that may occur with more generalized pattern matching and allows each resource group qualifier to support an independent domain within the hierarchy as will be discussed later.

Figure 3:
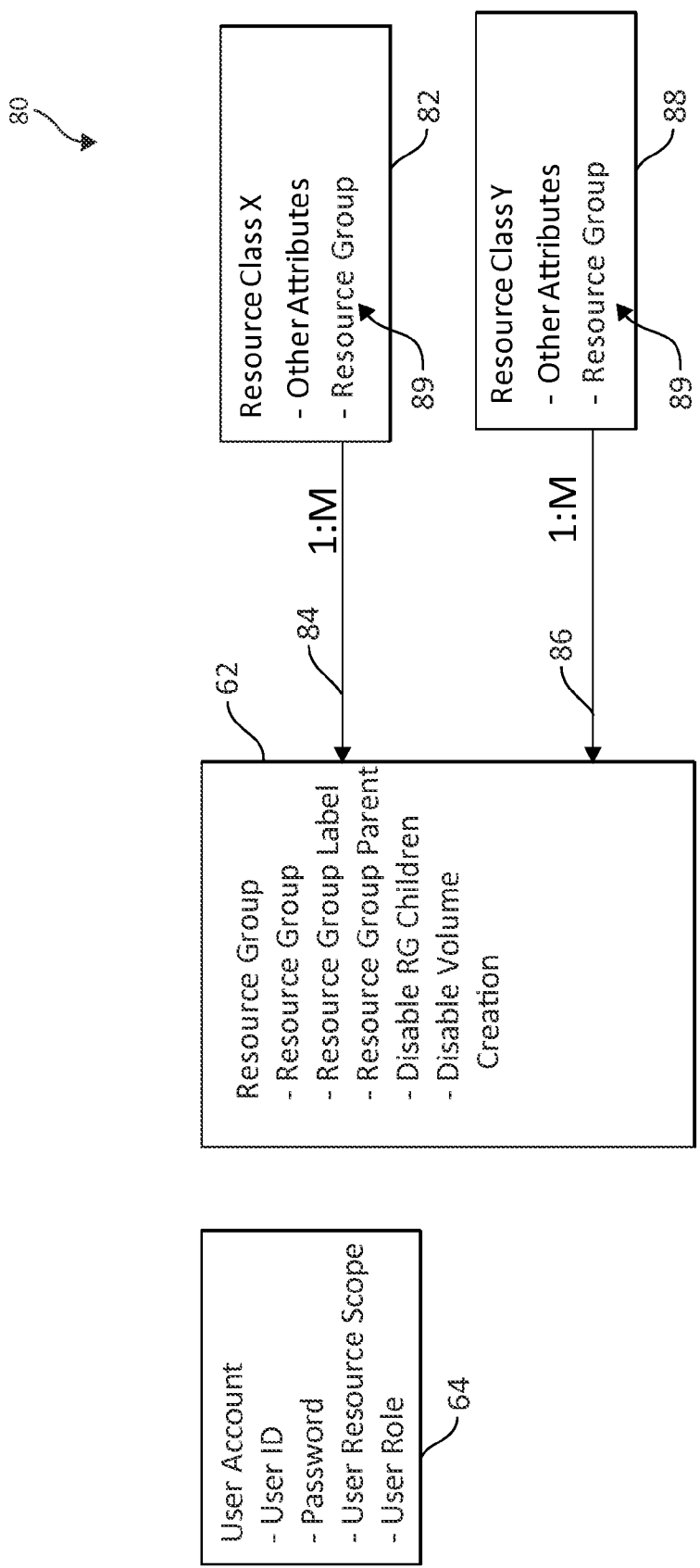
FIG. 3 are tables depicting exemplary functionality of resource policy object classes.

Turning now to FIG. 3, a block diagram representing an exemplary relationship 80 between a particular resource group 62 (including the resource group label attribute), the user account 64 (including the user resource scope and user role attribute), and various resource classes 82 and 88 are shown. The resource group 62 may be supported on varying resource object classes in a 1:M relationship (as denoted by arrows 84 and 86). For example, the resource class 82 or the resource class 88 may correspond to a particular storage resource configuration object type such as, a volume group(s) or a logical volume(s). One of ordinary skill will appreciate, however, that the resource group attribute 89 may be supported on other storage resource object classes.

In view of the above-described object structure in exemplary embodiment A, consider the following examples of object instances with the below-designated attributes:

Resource Group:
    Resource Group=1
    Resource Group Label="A.B.C/vol. 23"
Resource:
    Logical Volume=123
    Resource Group=1
Resource:
    Logical Volume=124
    Resource Group=1
User ID:
    User ID="John"
    User_Role="Administrator"

The two resource objects are logical volumes, and specifically, logical volumes 123 and 124. Both these resources are associated with resource group 1, which indirectly associates them with resource group label "A.B.C/vol.23". The user ID "John has a user resource scope A.B.*/vol*. Since the user resource scope "A.B.*/vol*" matches the resource group label "A.B.C/vol23" in resource group 1, user ID "John" has authority to manage the resources associated with resource group 1. User ID "John" would also have authority to access resources associated with other resource groups with a resource group label that matched his user resource scope.

Figure 4:
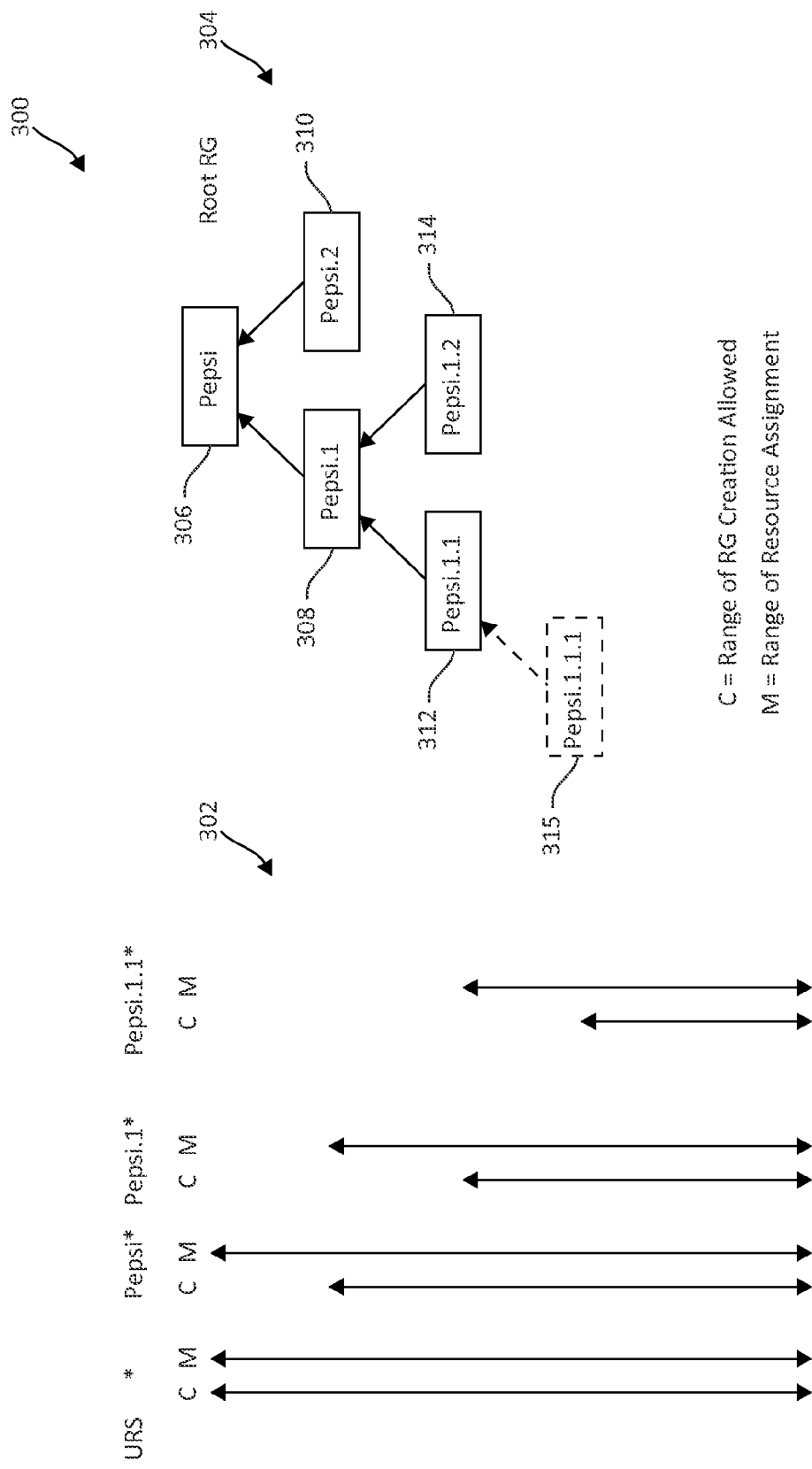
FIG. 4 is a block diagram depicting an exemplary embodiment for management hierarchy.

In FIG. 3, we further consider the "Resource Group Parent" attribute of the Resource Group object 62 by examining FIG. 4. The resource group parent attribute is set to zero when the resource group does not have a parent indicating that it is a root resource group. The resource group parent attribute is set to a non-zero number when the resource group parent attribute identifies the resource group object that is the parent of this resource group. In FIG. 4, we see from one exemplary embodiment 300 that the resource group with RGL Pepsi (306, FIG. 4) is a root resource group with two children (308 and 310) with RGLs Pepsi.1 and Pepsi.2, respectively. Additionally, Pepsi.1 has two children 312 and 314) with RGL Pepsi.1.1 and Pepsi 1.2 respectively. Any of these resource groups could potentially have additional children, for example as indicated by resource group, which is yet to be created with RGL Pepsi.1.1.1 (315, FIG. 4). The policies specified by the other resource group attributes are constrained to be at least a restrictive as the policies specified in its immediate parent resource group 312.

Furthermore in FIG. 4, there are a set of user resource scopes 302 defined, each with two ranges indicated specifying the range within the hierarchy 304 that the user ID is allowed to create or modify a resource group and the range within the hierarchy that the user ID is allowed to specify the resource group attribute of a storage resource that is in a resource group that the user ID has access to. As shown, a user ID with the global resource scope (*) can create, modify or delete, any resource group within the hierarchy including root resource groups, provided the user role is such that it allows it to create a resource group. A user ID with the Pepsi* URS is allowed to create or modify child resource groups of any resource group that has a resource group label that matches Pepsi*. As such, this user ID could create any resource group in this figure other than the root resource group 306 with RGL Pepsi. Additionally this user ID is allowed to reassign storage resources between any of the resource groups that match Pepsi* by modifying the resource group attribute of the particular configuration object associated with the storage resource. Similarly, we see that a user ID with a URL Pepsi.1* is limited to creating or modifying child resource groups of any resource group that matches its URL provided that its user role allows it to create resources groups and can move storage resources between resource groups that have a URL that matches its URS.

The resource group object 62 in FIG. 3 also has a Disable RG Children attribute that can be active or inactive. When active, no user ID is allowed to create a descendent of this resource group. In this way, a user ID that has the authority to create or modify a given resource group in the hierarchy can disable the creation of descendent resource groups to this resource group by any user ID that has the authority to create a child of the resource group.

The resource group object 62 in FIG. 3 also has a Disable Volume Creation attribute that can be active or inactive. When active, no user ID is allowed to create volumes in the resource group. In this way, a user ID that has the authority to create or modify a given resource group in the hierarchy 304 can disable the creation of volumes to this resource group by any user ID that has access the resource group. Since children of a resource group must have at least as restrictive policies as their immediate parent, this control also effectively disables the creation of volumes in all resource group descendants of this resource group. Thus the creator of the resource group may control assignment of volume resources to the resource group, while allowing the user IDs with access to the resource group to have the ability to manage the resources that are placed in the resource group, but deny them the ability to add additional resources to the subset of the resource group hierarchy that they have access to. This capability may be necessary in a multi-tenancy environment for a number of reasons including to control allocation of capacity between tenants at the highest level.

Figure 5:
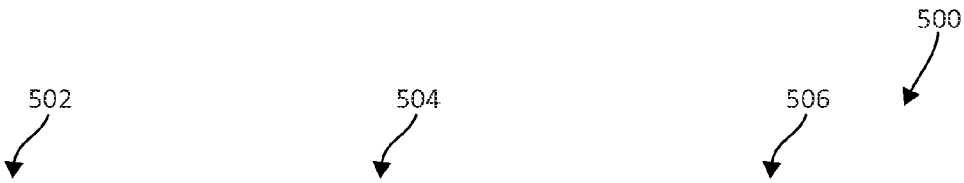
FIG. 5 is a block diagram depicting an exemplary embodiment for user management roles.

In FIG. 5, an exemplary set 500 of user roles are defined that are sufficient to support the operation of the management hierarchy as described by FIG. 4. The exemplary set 500 include a role 502, access authorities 504, and user resource scope 506 column describing the exemplary set 500. The storage administrator role has a global resource scope (*) and has the authority to create, modify or delete any resource group and any storage resource. These user IDs also have the authority to create any user IDs and assign any user role or user resource scope to the user IDs created. As such, the administrator role has sufficient authority to create, manage, modify, and delete any part of the storage subsystem configuration and to create, modify, manage, or delete any user ID within the management hierarchy. Such a role has the authority to partition the storage subsystem between the tenants of a multi-tenancy environment by creating a root resource group and one or more user IDs with a user administrator role for each supported tenant.

The user administrator role can only be assigned to a user ID by a user ID with a storage administrator role. The user administrator role is assigned a user resource scope and also is specified with a set of user roles, excluding the storage administrator role that the user ID is allowed to assign to user IDs it creates. A user ID with the user administrator role allowed to create, delete, or modify user IDs that have a subordinate user resource scope and have a user role that is one of the ones that are assigned to this user ID. In a multi-tenancy environment, a tenant that is provided a user ID with a user administrator role can be allowed to create its own user IDs and the user roles and user resource scopes are limited to a range determined by the administrator that created the user administrator user ID. For example, a user administrator for a Pepsi tenant would likely be given a Pepsi* user resource scope so that any of the tenants user IDs would have a resource scope that is subordinate to Pepsi*, thereby limiting all tenant user accounts to the Pepsi subset of the resource group hierarchy. Additionally, the User administrator ID might be assigned only the roles of User Administrator, Host Attachment Operator, and Copy Services Operator such that it is allowed to create additional user IDs which may have the User Administrator, Host Attachment Operator, or Copy Services Operator roles, but not the Physical Operator or Logical Operator role.

An physical operator or logical operator role is allowed to create, delete, or modify storage resources within the scope of its user resource scope and create resource groups that are children of resources groups within the scope of its user resource scope. The role also includes the authority to modify the resource group attribute of the storage resources groups within the scope of its user resource group. As such, a physical operator or logical role is allowed to extend the resource group hierarchy within the range of its URS and reassign resources within that subset of the resource group hierarchy. Such operation supports the dynamic creation of additional levels within the hierarchy by a given tenant in a multi-tenancy environment such that management of specific storage resources can be delegated to user IDs that have user resource scopes that are associated with the additional levels created.

A copy services role is limited to initiating copy services operations on storage resources within its user resource scope. The requested copy services operations may be further prescribed by other policies within the resource group associated with the storage resource(s) affected by the request as has been described in other patent applications.

As previously stated, the present invention provides support of a new user role that is intended to support a layer in the storage management hierarchy that is responsible for only the configuration of host attachments to logical volumes on the storage facility. In one embodiment, by way of example only, such roles may be configured in the configuration hierarchy of a DS8000 storage subsystem.

A host attachment operator role has the authority to create, delete, and modify Volume Groups, and SCSI Host Ports objects associated with a resource group within the scope of the user ID's user resource scope. The logical operator role has the authority to create, delete, and modify Logical Volumes objects associated with a resource group within the scope of the user ID's user resource scope and also has the authorities of a host attachment operator. A physical operator role has the authority to create, delete, and modify Arrays, Ranks, Extent Pools objects associated with a resource group within the scope of the user ID's user resource scope and also has the authorities of a logical operator. A User ID is created and assigned the host attachment operator role, logical operator role, or physical operator role by a User ID with a storage administrator role or user administrator role. A storage administrator role may create any user ID with any user role or user resource scope. A user administrator is limited to creating a user ID with one of a set of user roles specified for the user administrator and with a user resource scope that is subordinate to the user administrator's user resource scope.

The host attachment operator is designed to manage, control, and create a multiple subordinate resource groups based upon a variety of hierarchy rules for the resource groups. The host attachment operator may move or transfer multiple configuration objects (e.g., SHP and VG) between resource groups to which the configuration objects have authority to access. The subordinate resource groups may be a child of one of the resource groups to which a user has authority to access.

Figure 6:
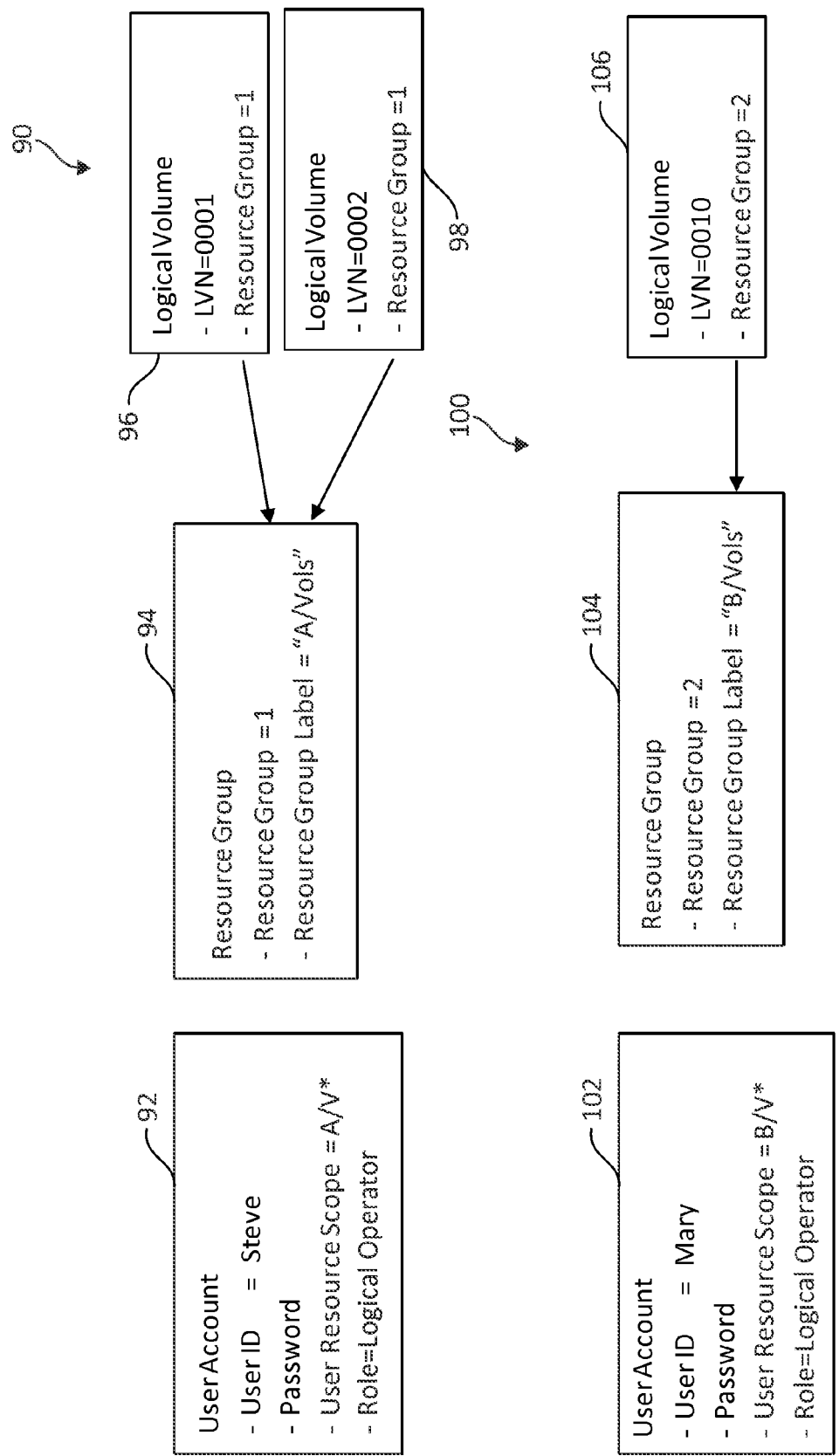
FIG. 6 is an additional block diagram depicting an exemplary operation of resource policies according to one embodiment of the present invention.

Turning now to FIG. 6, additional examples 90 and 100 of resource group operation is shown for user accounts "Steve" and "Mary," respectively. As is depicted for example 90, user account 92 includes user ID "Steve," with an accompanying password, user role of operator and user resource scope attribute of A/V*. A resource group (designated by reference 94) having resource group label "A/Vols" is associated with logical volumes 96 and 98 as shown. User account "Steve" is given access to create, modify, or delete logical volumes with Resource Group 1 due to his user resource scope attribute matching Resource Group 1's resource group label attribute and his operator role. "Steve" is not, however, authorized to create, modify, or delete logical volumes associated with Resource Group 2 (as will be further described with reference to user account "Mary" below) due to his resource scope attribute does not match Resource Group 2's resource group label attribute.

As is depicted for example 100, user account 102 includes user ID "Mary," with an accompanying password, user role of operator, and user resource scope attribute of B/V*. A resource group (designated by reference 104) having resource group label "BNols" is associated with logical volumes 106 as shown. User account "Mary" is given access to create, modify, or delete logical volumes with Resource Group 2 due to her user resource scope attribute matching Resource Group 2's resource group label attribute and her operator role. "Mary" is not, however, authorized to create, modify, or delete volumes associated with Resource Group 1 due to her user resource scope attribute does not matching Resource Group 1's resource group label attribute.

Figure 7:
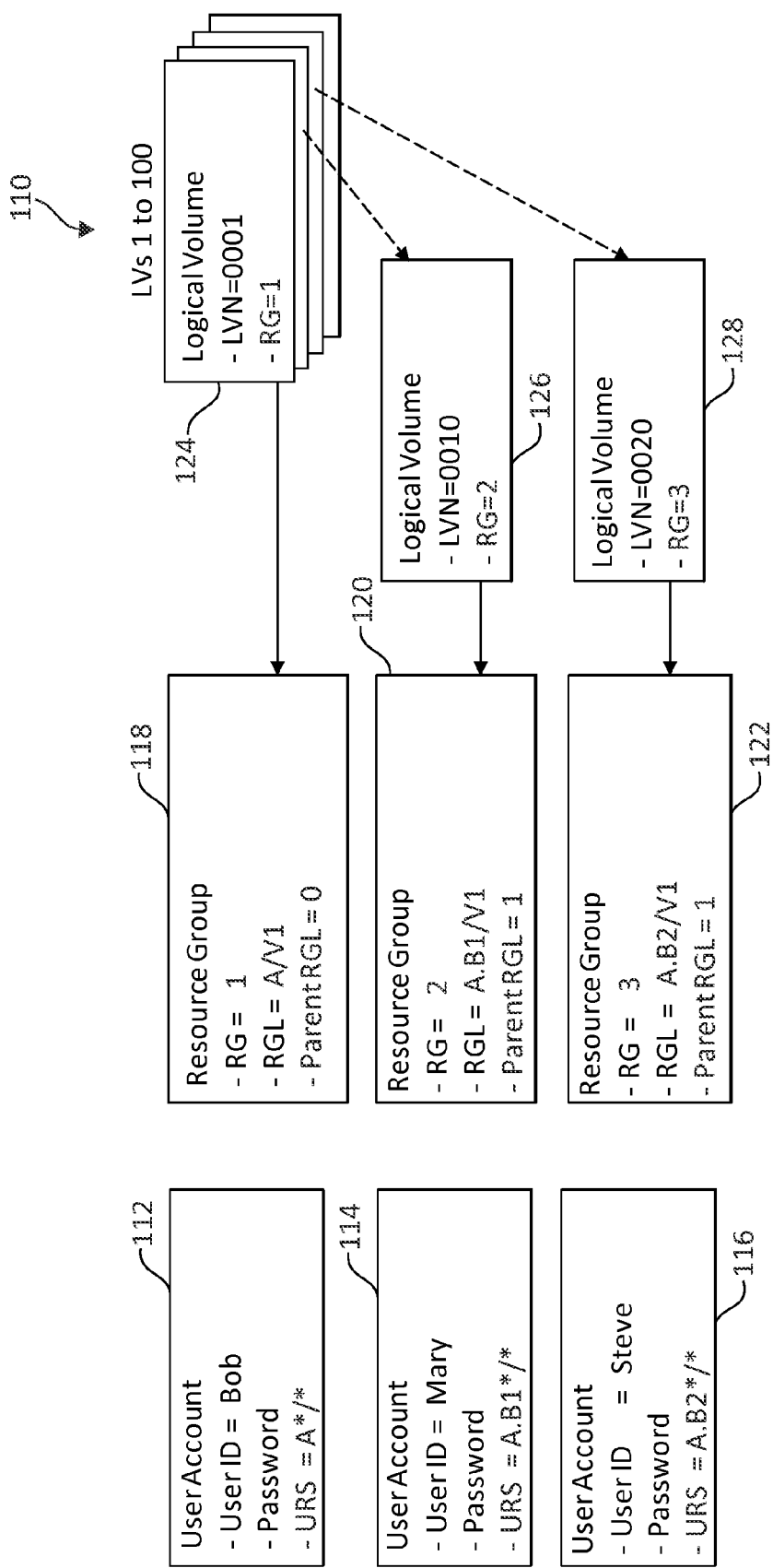
FIG. 7 is an additional block diagram depicting an additional exemplary operation of resource policies according to an additional embodiment of the present invention.

Turning to FIG. 7, an additional exemplary resource group operation 110 is shown in a hierarchical form for logical volume storage resources, in view of the foregoing discussion. User accounts "Bob" (block 112), "Mary" (block 114), and "Steve" (block 116) are shown. In addition, several resource groups 118, 120, and 122 are shown, with associated logical volumes 124, logical volume 126, and logical volume 128 as shown. As was previously depicted in FIG. 6, each resource group 118, 120, and 122 includes a corresponding resource group label attribute, and each of the logical volumes 124, 126, and 128 include a resource group attribute identifying its associated resource group 118, 120, and 122.

In view of the management structure depicted in FIG. 7, and in an exemplary scenario, user account "Bob" is given access to 100 logical volumes corresponding to resource group label A/V1 because his user resource scope is A*/* as shown. "Bob" may then create two resource groups that are children of and subordinate to Resource Group 1 (shown as resource groups 120 and 122). Resource group 120 corresponds to resource group label A.B1/V1, and resource group 122 corresponds to resource group label A.B2/V1. "Bob" may then also move some of the logical volumes 126 (0010) and 128 (0020) from resource group 1 to resource groups 2 and 3, respectively, by changing the resource group attributes on the logical volumes as shown. As a result, user account "Mary" has access to one subset of Bob's logical volumes and user account "Steve" has access to another subset of Bob's logical volumes, as their user resource scopes (A.B1*/* and A.B2*/*, respectively) give them access to the resource groups (A.B1/V1 and A.B2/V1 respectively) to which the logical volumes 126 and 128 are associated.

In the above examples, by convention, the first resource group qualifier and user resource scope qualifier is being used to manage the hierarchy of users and the second resource qualifier is being used to delineate a type of resource or a subset of a type of resources. In other embodiments, an organized hierarchy based on other entities may be realized. For example, the hierarchy may be based on a set of systems of a given type (a certain set of servers, for example), or a set of applications running on that set of systems (payroll, accounting, database, for example). In addition, the installation site that a storage resource, such as a volume, is located may be identified in one of the resource group qualifiers. Finally, another qualifier may be used to define a hierarchy associated with the scopes allowed for copy services relationships. As an example, the resource group label might have a general structure such as "management_hierarchy_qualifier/site.system/application/copy_services_hiearchy_qualifier/resource_type" with a specific instance being "Lev1-A.Lev2-B5.Lev3-23/Site1.AIX/Payroll/Global_Mirror.147/vol"

In addition to the foregoing, the number of tiers in a given hierarchy may be arbitrary, again as one of ordinary skill in the art will appreciate. While the foregoing examples use logical volumes for a storage resource type in one of the resource group label qualifiers, other storage resource types may be similarly implemented, such as logical subsystems, volume groups, performance groups, host ports, and the like. Storage resources may be further designated in a resource group qualifier to indicate other attributes. For example, volume types may be delineated with a resource qualifier such as "vol.thin" or "vol.thick" to designate applicable provisioning, or "vol.ckd.Mod3" for Mod 3-sized count key data (CKD) volumes. As one of ordinary skill in the art will appreciate, any manner of delineating an arbitrary hierarchy of resources (via one of the resource group qualifiers) with an arbitrary subdivision of resources within a given hierarchy node (other resource group qualifiers) is contemplated. Similarly, various policy attributes within the resource group may apply to one or the other type of storage resources and there may be policies which are unique to a given storage type. For example, a policy attribute might control whether storage resources of a given type are allowed to be associated with the resource group.

To facilitate migration from existing implementations without preexisting resource groups to an implementation having resource groups, default attributes may be implemented. In one example, a default Resource Group 0 may include a resource group label attribute "PUBLIC" and its policies may be such that it represents the default behavior of the storage subsystem. In this case, any existing resources are assigned to Resource Group 0, existing administrator user IDs are assigned a global (*) resource scope and any existing non-administrator user IDs are assigned to user resource scope PUBLIC. As such, initially all user IDs have access to all resources. The default resource group is a root resource group.

One or more user accounts may be initialized as an administrator account. The administrator, as a result, may then assign user resource scope and user role attributes to other user accounts. User IDs with a resource scope other than PUBLIC (the default scope) correspondingly have access to the resource groups with resource group labels that match their user resource scope and additionally to the resource group PUBLIC.

The figures described below are exemplary methods and diagrams for implementing partitioning hierarchical management authority of system resources in a computing storage environment across multiple tenants and multiple tenant users at multiple levels of a hierarchy. In one embodiment of the present invention, the exemplary embodiments create a relationship between a parent resource group and child resource groups such that the child resource groups must have subordinate policy attributes. Furthermore, one exemplary embodiment expands the ability of user IDs, which may be lower in the hierarchy of resource groups, to create child resource groups to expand the resource group hierarchy within the constraints of the parent resource group policies. Such ability is dependent on the existence of there being storage resources associated with resource groups, resource group policies, and user ID with URSs, and additionally a way to non-disruptively add the software code on the machine using default resource groups, default user resource scopes, and some specific default values for some of the policy attributes.

Figure 8:
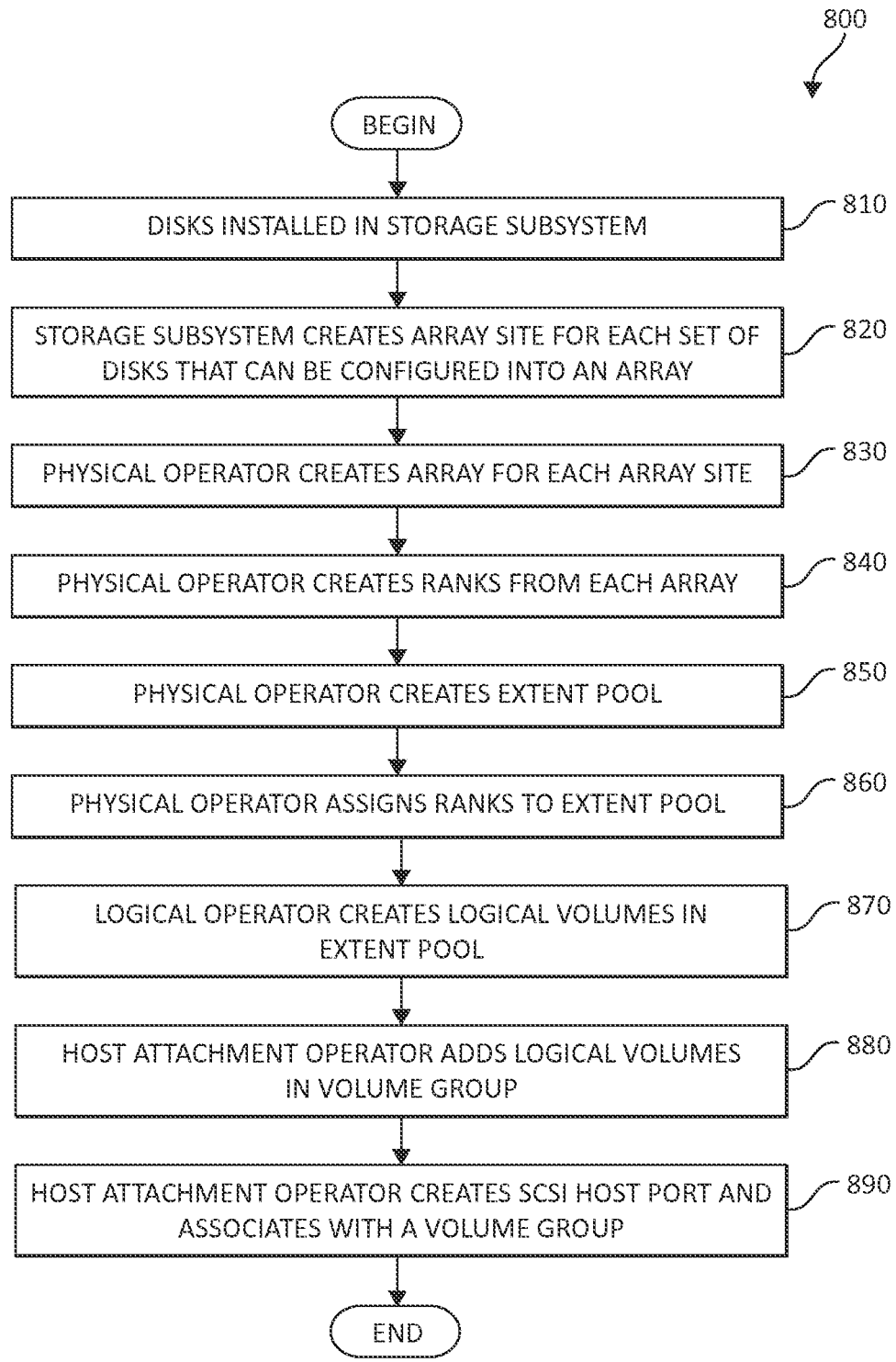
FIG. 8 is a exemplary method of storage configuration according to one embodiment of the present invention.

FIG. 8 is an exemplary method 800 of a storage configuration process. The method 800 begins (step 805) by installing a set of disks in the storage facility (step 810). The storage subsystem creates a set of array site objects in the configuration that represent sets of physical disks that can be configured into an array (step 820). Subsequently, the user IDs perform configuration of the storage subsystem by the method 800. A user ID with physical operator authority selects one or more array site objects to create an array object, specifying a RAID type such as RAID 5 (step 830). A user ID with physical operator authority selects one or more array objects to configure a rank, specifying the type of storage that the rank is to support such as SCSI LUNs (step 840). A user ID with physical operator authority creates one or more extent pool objects (step 850). A user ID with physical operator authority associates one or more ranks with each of the extent pools (step 860). A user ID with logical operator authority configures one or more logical volumes within an extent pool such that the physical capacity for the logical volume is obtained from ranks associated with the extent pool (step 870). Next, a user ID with host attachment operator authority configures one or more volume group objects and a user ID with host attachment operator authority assigns one or more logical volumes to the volume group (step 880). A host attachment operator configures one or more SCSI host port objects that associate a host's I/O port through its WWPN with a volume group object (step 890). The method 800 ends (step 895).

FIG. 9a-9g is exemplary of a method of distributing the configuration process in FIG. 8 in a multi-tenancy environment where the tenant's are responsible for configuring the host attachments (volume groups and SCSI host ports) on the tenants assigned logical volumes. The various figures are associated with the actions performed by a particular user ID performing a particularly phase of the configuration process. The process can be thought to flow in order though the various figures as shown.

Figure 9A:
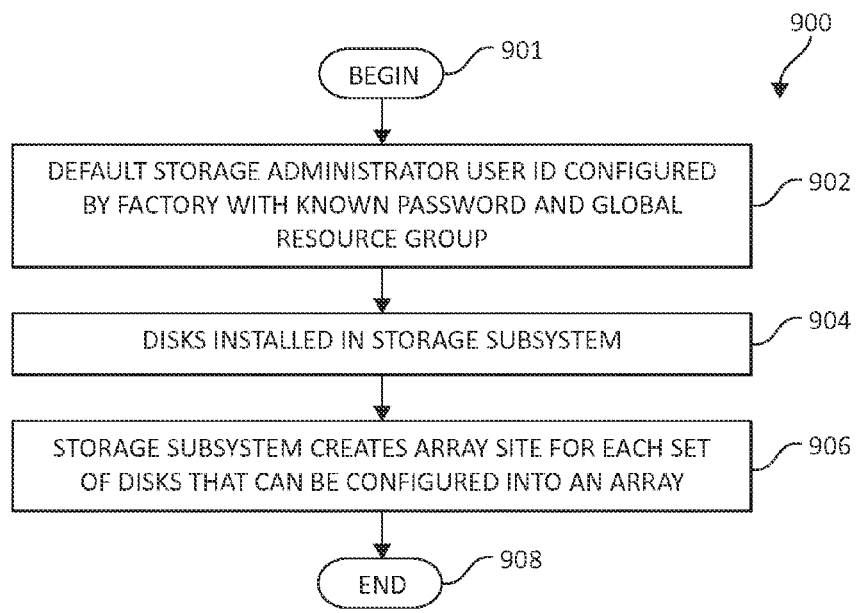
FIG. 9A is a flow chart diagram of an exemplary method of configuration of a storage subsystem performed at a factory according to one embodiment of the present invention.

FIG. 9A, following, illustrates an exemplary method 900 of configuring of a storage subsystem performed at a factory. The method 900 begins (step 901) configuring a factory default storage administrator ID on the storage subsystem with a predefined expired password and a global resource scope (step 902). Physical disks are installed in the storage subsystem (step 904). Any disks that are installed in the factory (or later in the field) are associated into logical groups called array sites that are suitable for configuring into an array (step 906). The method 900 ends (step 908).

Figure 9B:
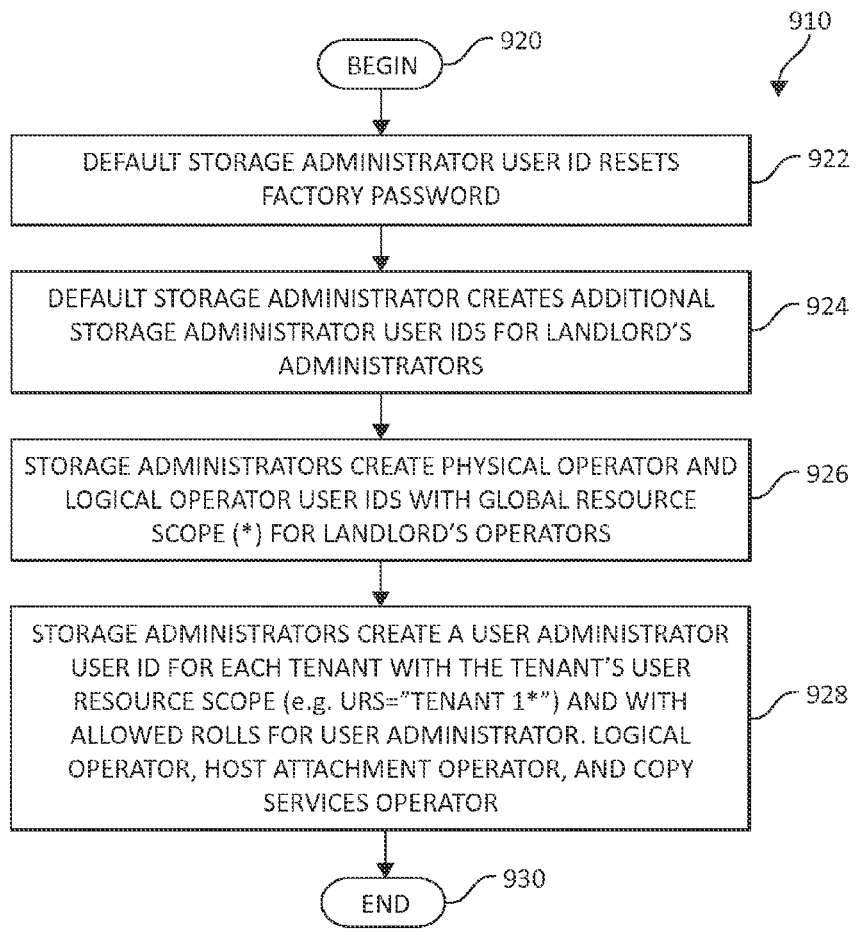
FIG. 9B is a flow chart diagram of an exemplary method of configuring a host attachment to a storage system according to one embodiment of the present invention.

FIG. 9B, following, illustrates an exemplary method 910 for configuring actions when the storage subsystem is first installed at a customers account. The customer should be referred to as the landlord since it is this customer who will be managing the storage subsystem in behalf of the various tenants that will be sharing the storage subsystem resources. The landlord's administrator performs the initial configuration of the storage subsystem. The method 910 begins (step 920) and on first login to the factory default storage administrator user ID, the storage subsystem requires the expired password to be updated, thereby securing the login (step 922). The default storage administrator user ID may be used to create additional storage administrator logins (step 924). The storage administrators configure additional logins for the landlord's physical operators and logical operators, all with a global resource scope (*) (step 926). Further configuration of the storage subsystem is delegated to these operators as will be discussed subsequently. The storage administrator also creates one user administrator account for each tenant (step 928). This user administrator account has a user resource scope that is a unique label assigned to the tenant with an * appended (e.g. 'tenant1*'). The user administrator account is also configured with a set of allowed roles that determines what type of roles it can assign to user IDs it creates. For this embodiment, the user account is limited to the User Administrator, Logical Operator, Host Attachment Operator, and Copy Services Operator roles. The method 910 ends (step 930).

Figure 9C:
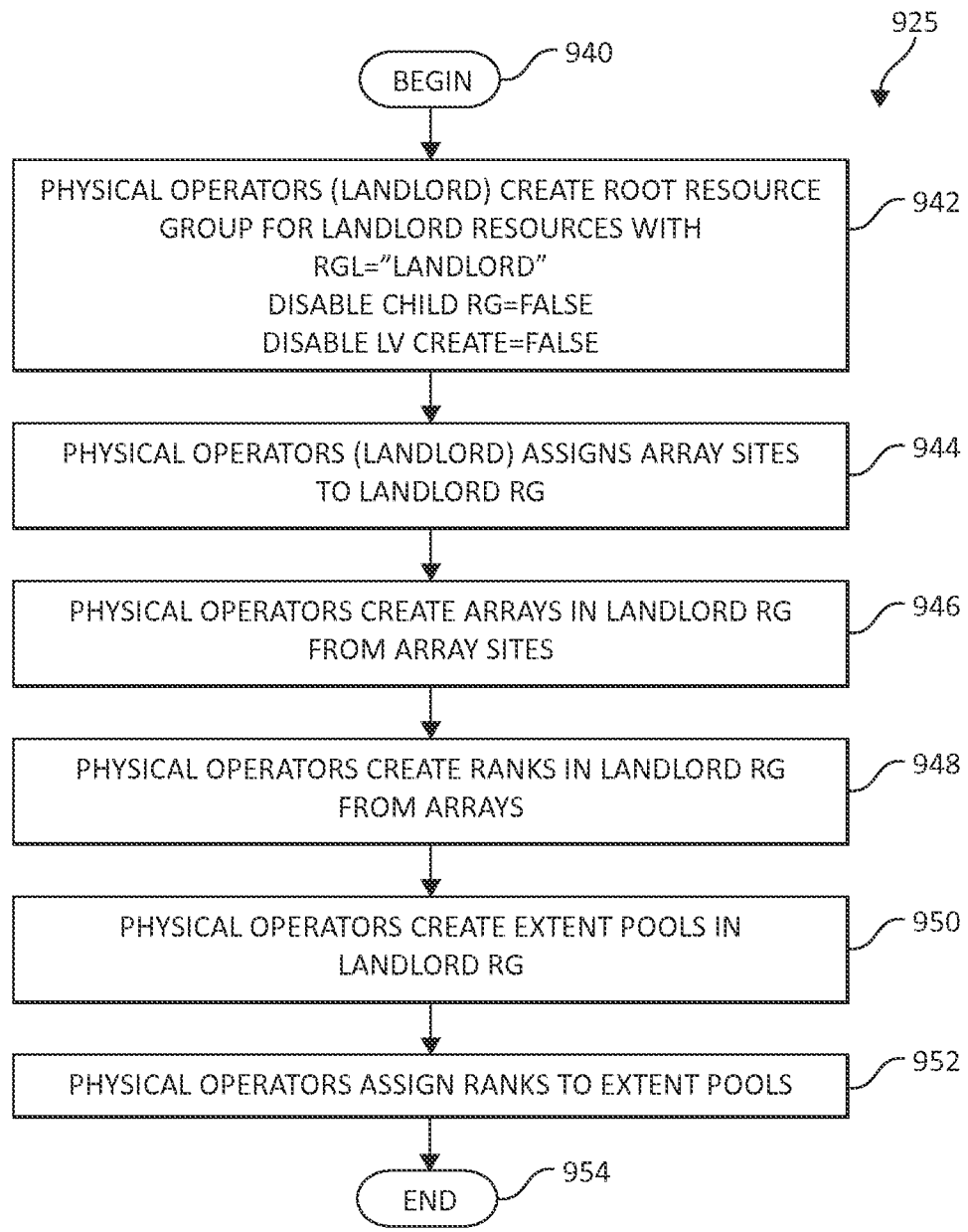
FIG. 9C is a flow chart diagram of an exemplary method of configuration actions performed by the landlord's physical operators to create storage pools for logical volumes to use according to one embodiment of the present invention.

FIG. 9C, following, illustrates an exemplary method 925 for configuration actions performed by a landlord's physical operators to create storage pools for logical volumes to use. The method 925 begins (step 940) with the landlord's physical operator creating a root resource group for storage subsystem resources that are managed by the landlord and set the RGL="Landlord" (step 942). Any name would work since the physical operator has a global resource scope (*) that provides access to all resource groups. The physical operator moves all array sites to the Landlord's resource group (from PUBLIC) (step 944). The physical operator creates an array in the Landlord's RG for each array site, defining the RAID type of the array (e.g. RAID 5) (step 946). The physical operator configures a rank for each array, defining the storage type for each array (e.g. SCSI LUN storage) (step 948). The physical operator configures one or more extent pools in the Landlord's RG (step 950) and the physical operator assigns one or more ranks to each extent pool (step 952). The method 925 ends (step 954).

Typically, the characteristics of the ranks in an extent pool are consistent such that a volume configured in that extent pool has a consistent set of attributes (e.g. RAID type, disk speed, etc.). At this point, the storage subsystem is ready to be configured with logical volumes for each tenant.

Figure 9D:
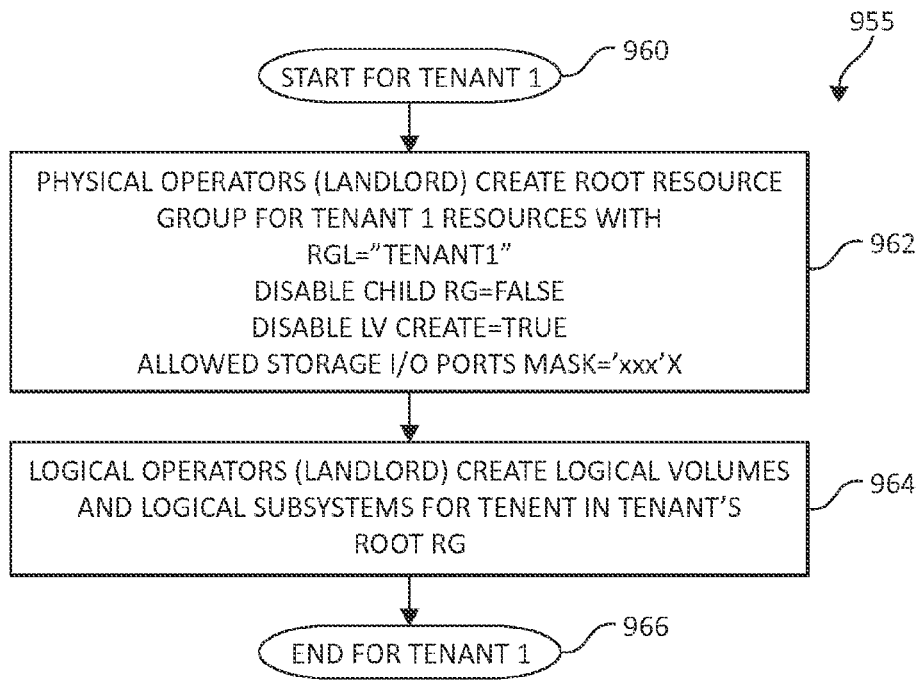
FIG. 9D is a flow chart diagram of an exemplary method of configuration actions performed by the landlord's physical operators and logical operators in behalf of a given tenant according to one embodiment of the present invention.

FIG. 9D, following, illustrates an exemplary method 955 for configuration actions performed by the landlord's physical operators and logical operators in behalf of a given tenant. The method 955 begins (step 960) by starting for tenant 1 and the landlord's physical operator creates a root resource group for the tenant with a resource group label that is uniquely assigned to the tenant and matches the label assigned to the tenant's user administrator's user resource scope (step 962). In addition, three policies are configured in the resource group that (1) allow the configuration of child resource groups for this root resource group and (2) disable the creation of logical volumes, and (3) an allowed storage I/O Port mask that limits the storage subsystem I/O ports that can be specified in an I/O port mask of a SCSI host port in this resource group. As will be discussed subsequently, the intent here is for the landlord to control the allocation capacity to each tenant (by assigning landlord configured logical volumes to the tenant), but allowing the tenant to manage the configuration of host attachments with a hierarchy of operators that will require the use of additional resource groups for partitioning. The landlord's logical operators configure one or more logical volume's in the tenant's root RG using capacity from one the landlord's extent pools (step 964). The method 955 for tenant 1 ends (step 966). In one embodiment, the logical subsystems (groups of 256 logical volumes) associated with the tenant's logical volumes are also assigned to the tenant's root resource group. Certain copy services operations function at the logical subsystem level such that partitioning between tenants at less than a logical subsystem granularity is generally undesirable.

Figure 9E:
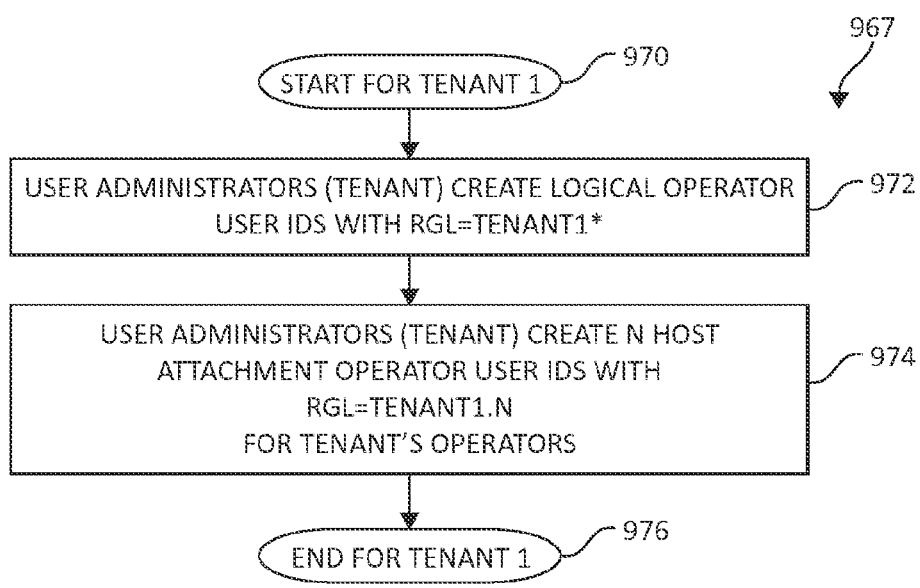
FIG. 9E is a flow chart diagram of an exemplary method of configuration performed by the tenant's user administrator according to one embodiment of the present invention.

FIG. 9E, following, illustrates an exemplary method 967 for configuration performed by the tenant's user administrator. The method 967 begins for tenant 1 (step 970) the tenant's user administrator creates logical operators for the tenant with resource group label equal to the user administrator's user resource scope (e.g. 'tenant1*') (step 972). As will be discussed, the function of these logical operators will be to partition the logical volume resources in the tenant's root resource group between various host attachment operators. The tenant's user administrator creates host attachment operator user IDs for the tenant with a user resource scope (URS) that will be associated with a subset of the tenant's logical volumes (step 974). This URS must be subordinate to the user administrator's URS (i.e. it must start with 'tenant1'). For this example, with N host attachment operators, simply assign the URSs as 'tenant1.N' where the N is replaced by a unique integer assigned to each host attachment operator. These host attachment operator user IDs may be requested by the logical operator that is coordinating the assignment of logical volumes to the host attachment operator as discussed subsequently. The method 967 for tenant 1 ends (step 976).

Figure 9F:
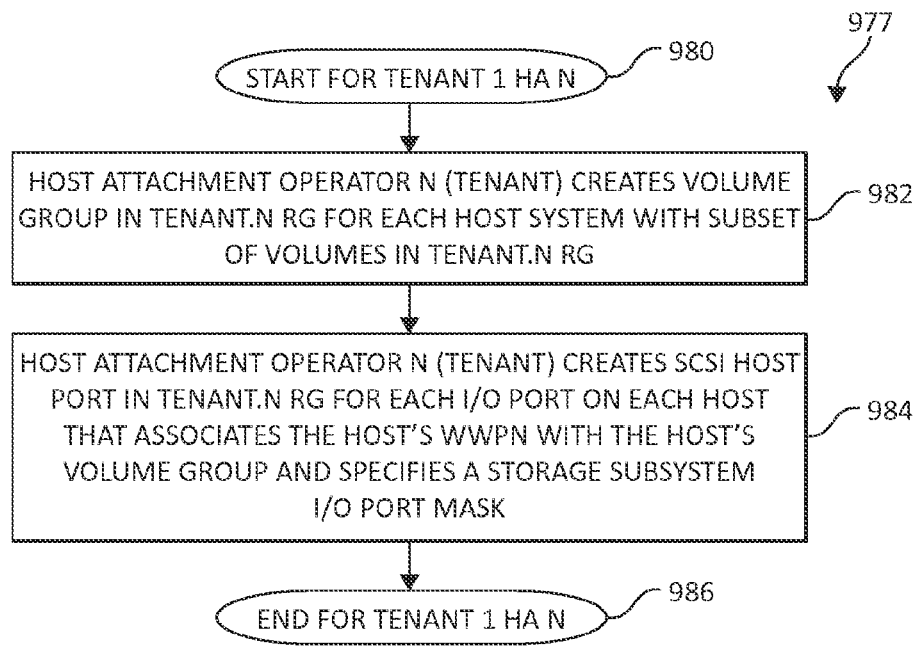
FIG. 9F is a flow chart diagram of an exemplary method configuration performed by a tenant's logical operators according to one embodiment of the present invention.

FIG. 9F, following, illustrates an exemplary method 977 for configuration performed by the tenant's logical operators. The method 977 begins (step 980) the tenant logical operator creates a child resource group of the tenant's root resource group for each host attachment operator that will be managing a set of logical volume's host attachment (step 982). These RGs are created with a RGL that is subordinate to their parent's RG's RGL (i.e. it must start with. 'tenant1' and be unique). For this example, with N host attachment operators, the mechanisms simply assign the RGLs as 'tenant1.N' where the N is replaced by a unique integer assigned to each host attachment operator. Since this RGL must be coordinated with the host attachment operator's URS, typically the logical operator would request the user administrator to create these host attachment operator user IDs with the appropriate URS as previously discussed for step 974 in FIG. 9E. The logical operator changes the resource group of one or more logical volumes assigned to the tenant's root resource group to the resource group of one of the host attachment operators (step 984). This gives the host attachment operator ability to configure the host attachments for these volumes as will be discussed. The method 977 for tenant 1 ends (step 986).

Figure 9G:
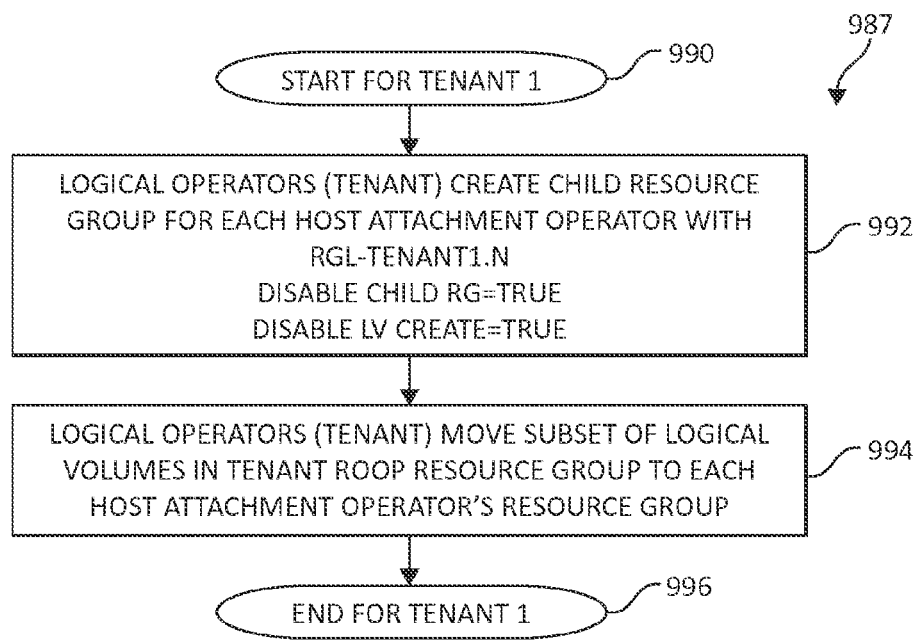
FIG. 9G is a flow chart diagram of an exemplary method of configuration performed by the tenant's host attachment operator N according to one embodiment of the present invention.

FIG. 9G, following, illustrates an exemplary method 995 for configuration performed by the tenant's host attachment operator N. The method 995 begins (step 990) with the host attachment operator N creating a volume group in resource group tenant1.N for each host system requiring a unique set of logical volumes in resource group tenant1.N (step 992). The host attachment operator configures a SCSI host port for each host I/O port that is attached to the logical volumes in the volume group configured and associating each host's I/O port's WWPN with the volume group (step 994). The method of tenant 1 HAN ends (step 996). In one embodiment, the SCSI host port specifies an I/O port mask to limits which ports on the storage subsystem can be used by this host I/O port. The I/O Ports specified in the I/O port mask are limited by the Allowed Storage I/O Port Mask in the SCSI host port's resource group.

To support this management hierarchy of administrators using resource groups, a set of rules are needed that prevent any user ID from exceeding its authority over the configuration of resources. For this embodiment, the following rules are exemplary, but not the only possible definition, as would be apparent to one skilled in the art. (1) A storage administrator has a global resource scope (*) can create any user ID with any role or any user resource scope. (2) A user administrator is defined with set of allowed user roles and a specified user resource scope. A user administrator can only create a user IDs that have one of the allowed user roles and has a user resource scope that is subordinate to his URS. (3) Only a physical operator with global scope ("*") is allowed to create a root resource group (e.g. a resource group with no parents). (4) A physical operator, logical operator, or host attachment operator is (a) allowed to create children a resource group that is within the scope of their URS, provided the parent resource group allows the creation of RG children in its policies (b) not allowed to modify a resource group unless they are also authorized to create it (c) allowed to create resources that are allowed by their role provided they are assigned to a resource group within the scope of their URS (d) allowed to modify or delete resources that are allowed by their role provided they are assigned to a resource group within their scope and (e) allowed to change the resource group of an existing resource provided the resources current and new resource group are within the scope of the user ID. (5) A physical operator can only (a) create an array in a resource group within the scope of his URS from an array site within the scope of his URS, (b) create a rank in a resource group within the scope of his URS from an array within the scope of his URS (c) create an extent pool in a resource group within the scope of his URS and (d) assign a rank within the scope of his URS into an extent pool within the scope of his URS. (6) A logical operator can only create a logical volume in a resource group within the scope of his URS from an extent pool in a resource group within the scope of his URS or in a resource group that is the direct ancestor of a resource group within the scope of his URS. Creation of logical volumes within a resource group is prevented if the resource group does not allow the creation of logical volumes via its policies. (7) A host attachment operator can only (a) add a logical volume to a volume group if the logical volume is in a resource group that is within the scope of his URS (b) associate a volume group with a SCSI host port if the volume group and SCSI host port are both in resource groups within his scope. (8) All resource group labels are unique within a storage subsystem. All child resource groups have resource group labels that are subordinate to their parents and policy attributes that at least as restrictive as their parents.

In addition to the above rules enforced by the storage subsystem, the following policies are necessary to protect the tenant's resources from in appropriate access: (1) The landlord does not provide any storage administrator user IDs to any tenant. (2) For this embodiment, the landlord does not provide any physical administrator user IDs to any tenant. (3) The user administrator ID provided to any tenant must have a unique label within the URS that is used in only that tenant's user ID's URS. This URS must contain the same label that is used in the tenant's RG's RGL. (4) The user administrator ID provided to any tenant is prevented from creating storage administrator and physical administrator user IDs. (5) The policies in the root resource group set by the landlord must be consistent with the intended management hierarchy.

In understanding the implications of the rules defined for this hierarchy, it is just as important to understand what the rules allow as what the rules prevent. For instance, resources in tenant 1's root resource groups or any of the associated child resource groups are accessible to user IDs create by tenant 1's user administrator, but not by any resources created by any other tenant's user administrator. Logical volumes, volume groups, and SCSI host ports assigned to a resource accessible to one host attachment operator cannot be accessed by another host attachment operator that does not have access to that resource group. As such, it is possible to safely divide logical volume resources between multiple tenants and further it is possible to safely divide those logical volume resources between multiple host attachment administrators to further partition the management tasks associated with host attachments. Also, it is possible to support additional layers in hierarchy by creating addition descendants between the tenant's root resource group and the host attachment operators resource group that are accessible by a hierarchy of logical operators. For instance, the following hierarchy of administrators and resource groups would support four levels of hierarchy, with the resources assigned to one parent being partitioned between all its descendants.

| Level | Administrator (Role - URSs) | Resource Groups |
|---|---|---|
| 1 | Logical Operator - Tenant1* | Tenant1 |
| 2 | Logical Operator - Tenant1.A* | Tenant1.A |
|   | Logical Operator - Tenant1.B* | Tenant1.B |
| 3 | Logical Operator - Tenant1.A.A* | Tenant1.A.A |
|   | Logical Operator - Tenant1.A.B* | Tenant1.A.B |
|   | Logical Operator - Tenant1.B.A* | Tenant1.B.A |
| 4 | Host Attach Op - Tenant.A.A.A | Tenant1.A.A.A |
|   | Host Attach Op - Tenant.A.A.B | Tenant1.A.A.B |
|   | Host Attach Op - Tenant.B.A.A | Tenant1.B.A.A |

Figure 10:
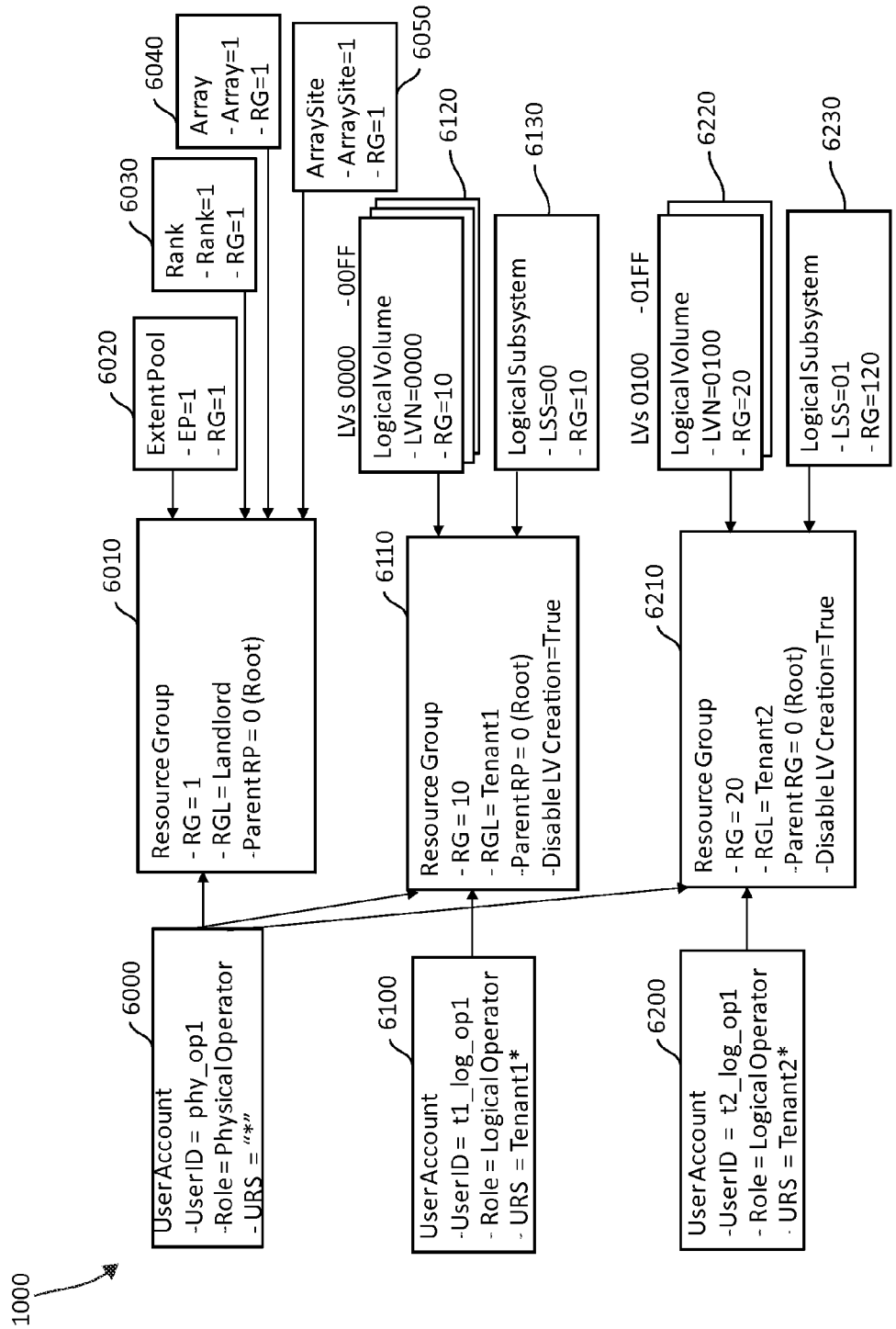
FIG. 10 is a block diagram depicting an exemplary embodiment showing a set of configuration objects that are exemplary of a configuration after the landlord's physical operator has configured a pair of tenants according to one embodiment of the present invention.
Figure 11:
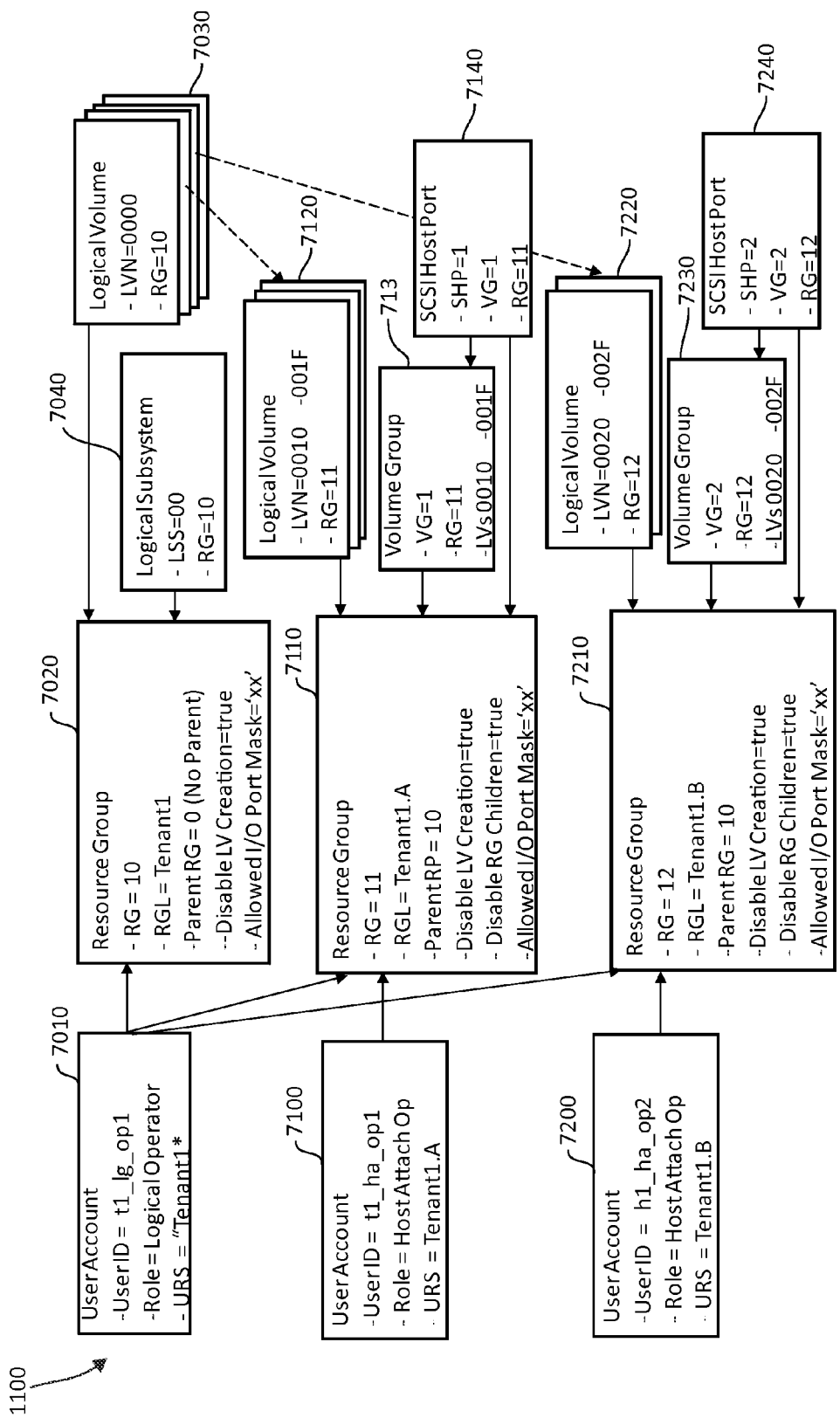
FIG. 11 is a block diagram depicting an exemplary embodiment showing a set of configuration objects that are exemplary of a configuration for a given tenant after the logical operator and host attachment operator have performed their configuration operations according to one embodiment of the present invention.

To further clarify the operation of the methods in FIG. 9, FIG. 10 is a block diagram depicting an exemplary embodiment showing a set of configuration objects that are exemplary of a configuration after the landlord's physical operator has configured a pair of tenants. FIG. 11 is a block diagram depicting an exemplary embodiment showing a set of configuration objects that are exemplary of a configuration for a given tenant after the logical operator and host attachment operator have performed their configuration operations. Turning to FIG. 10, physical operator 6000 has created resource groups 6010, 6110, and 6210 for the landlord, tenant1, and tenant2 respectively. Further more, array sites 6050, arrays 6040, ranks 6030, and extent pools 6020 have been assigned to the Landlord's RG and logical volumes 6120, 6220 and logical subsystems 6130, 6230 have been assigned to the two tenant's resource groups 6100, 6200 respectively. Additionally, logical operator user IDs 6100 and 6200 have been created for tenant's 1 and tenant 2, respectively, by the tenant's user administrator.

Turning to FIG. 11, the tenant logical operator 7010 has created child resource groups 7110, and 7210 and assigned logical volumes 7120, 7220 to each, respectively. Furthermore host attachment operators 7100, 7200 have user accounts configured that allow access to their respective resource groups 7110, 7210. Furthermore the host attachment operators have configured volume groups 7130, 7230 and SCSI host ports 7140, 7240, for their respective logical volumes 7120, 7220 in their respective resource groups, 7110, 7210.

In one embodiment, by way of example only, the methods and figures described previously are illustrated using an IBM DS8000 storage system. The DS8000 is configured to allow a SCSI Host I/O port attached to one or more DS8000 I/O ports to access specific volumes. Such configuration is accomplished by creating a SCSI Host Port Object and linking the SCSI host port configuration object to a Volume Group configuration object in the DS8000 configuration. The SCSI host port (SHP) configuration object is configured with the host port's worldwide port name (WWPN), a port mask for the set of DS8000 I/O ports that this WWPN is allowed to access the DS8000, and the identifier of a Volume Group configuration. The volume group (VG) contains a list of volumes configured on the DS8000 storage subsystem. When a SCSI host port login into one of the DS8000 I/O ports, the host port provides its WWPN. The DS8000 checks to see if there is a SHP that matches the WWPN of the host and, if found, accepts the login such that subsequently, this host port is allowed to access an volume specified in the volume group object associated with this I/O port.

Additionally, the described configuration objects (volume groups and SCSI host ports) are required to be associated with resource groups such that the user ID scope for access to the volume group and SCSI host port objects can be controlled (i.e. partitioned between administrators). The Scope of access includes creation, deletion, and modification of these configuration objects. Also certain policies are enforced, some of which have associated controls in the resource group object. The policies and controls include a control that is defined so that the I/O Port allowed mask that limits which I/O Ports can be added to the SHP. New and additional policies are defined as 1) creation or modification of an SCSI host port is limited such that the I/O port mask specified is limited to the set allowed in the I/O Port Allowed mask, 2) assignment of SHP to volume groups is limited to volume groups within the scope of the user ID's user resource scope (URS). The URS selects some number of resource groups that can have associated volume groups, and 3) assignment of logical volumes to volume group objects is limited to logical volumes within the scope of the user ID's user resource scope (URS). The URS selects some number of resource groups that can have associated logical volumes. The host attachment operator may also create new subordinate resource groups per the hierarchy rules for resource groups (must be a child of a resource group that the user has access to) and move SHP and VG objects between resource groups that the SHP and VG objects are allowed to access.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagram in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

What is claimed is:

1. A system of hierarchy multi-tenancy support for configuration of a plurality of host attachments through a plurality of resource groups in a computing storage environment, comprising:
    a processor device in the computing storage environment, wherein processor device is adapted for:
        configuring a plurality of data storage systems with a plurality of operators for configuration and management of the plurality of host attachments to a plurality of logical volumes,
        designating a logical operator with at least the responsibility of designating authority to a host attachment operator and ability to configure a plurality of logical volumes,
        providing limited authority for the host attachment operator to configure a plurality of volume groups and a plurality of host ports to at least a specific user,
        providing an administrator with the ability to configure at least one of those of the plurality of resource groups for a specified tenant,
        assigning a configured one of the plurality of logical volumes to those of the plurality of resource groups belonging to the specified tenant, wherein the logical operators of the specified tenant is given authority to manage the plurality of logical volumes of the specified tenant and the ability to specify those of the plurality of resource groups of the specified tenant a policy whereby the logical operators of the specified tenant are prevented from one of configuring an additional number of the logical operators and expanding the plurality of logical volumes that are existing, and
    enforcing a plurality of policies and a plurality of controls for performing one of at least configuration, modification, deletion, and management of a plurality of configuration objects, the plurality of policies adapted to include at least one of the plurality of controls associated in a plurality of resource group objects, the plurality of policies and the plurality of controls include at least one of the following:
        performing one of creating and modifying of the plurality of host ports for limiting a specified at least one I/O port to the set allowed in a I/O port allowed mask,
        assigning at least one of the plurality of host ports to at least one of the plurality of volume groups, wherein the assignment of the at least one of the plurality of host ports is limited to the plurality of volume groups within a scope of access to a user resource scope in a user ID, and
        assigning the plurality of logical volumes to a plurality of volume group configuration objects, the assignment of the plurality of logical volumes is limited to the plurality of logical volumes within a scope of access to the user resource scope in the user ID.

2. The system of claim 1, wherein the processor device is further adapted for adding a plurality of resource group attributes to a plurality of configuration objects to associate with a specific one of the plurality of resource groups, wherein an authority to manage and control the plurality of configuration objects is created for a user role with a user ID scope of access to the plurality of configuration objects is created with authority to manage and control the plurality of configuration objects.

3. The system of claim 2, wherein the processor device is further adapted for configuring the user ID scope of access to include at least one of creating, deleting, and modifying the configuration of the plurality of configuration objects.

4. The system of claim 1, wherein the processor device is further adapted for authorizing the administrator to create a tenant administrator identification (ID) having authority to configure a plurality of user IDs with a specific user role and limited to a user scope that is consistent with the user scope of a tenant administrator, wherein a tenant is adapted to configure the logical operator and the host attachment operator having authority to access a plurality of resources within a scope of the tenant.

5. The system of claim 1, wherein the processor device is further adapted for creating and adding at least one I/O port allowed mask attribute by the plurality of resource groups.

6. The system of claim 1, wherein the processor device is further adapted for configuring the logical operator to manage, control, and create a plurality of subordinate resource groups based upon a plurality of hierarchy rules for the plurality of resource groups and move a plurality of configuration objects between the plurality of resource groups to which the logical operator authority to access, the plurality of subordinate resource groups being a child of one of the plurality resource groups to which a user has authority to access.

7. A computer program product for hierarchy multi-tenancy support for configuration of a plurality of host attachments through a plurality of resource groups in a computing storage environment by a processor device, the computer program product comprising a non-transitory computer-readable storage medium having computer-readable program code portions stored therein, the computer-readable program code portions comprising:
    a first executable portion for configuring a plurality of data storage systems with a plurality of operators for configuration and management of the plurality of host attachments to a plurality of logical volumes;
    a second executable portion for designating a logical operator with at least the responsibility of designating authority to a host attachment operator and ability to configure a plurality of logical volumes;

a third executable portion for providing limited authority for the host attachment operator to configure a plurality of volume groups and a plurality of host ports to at least a specific user;

a fourth executable portion for providing an administrator with the ability to configure at least one of those of the plurality of resource groups for a specified tenant;

a fifth executable portion for assigning a configured one of the plurality of logical volumes to those of the plurality of resource groups belonging to the specified tenant, wherein the logical operators of the specified tenant is given authority to manage the plurality of logical volumes of the specified tenant and the ability to specify those of the plurality of resource groups of the specified tenant a policy whereby the logical operators of the specified tenant are prevented from one of configuring an additional number of the logical operators and expanding the plurality of logical volumes that are existing; and a sixth executable portion for enforcing a plurality of policies and a plurality of controls for performing one of at least configuration, modification, deletion, and management of a plurality of configuration objects, the plurality of policies adapted to include at least one of the plurality of controls associated in a plurality of resource group objects, the plurality of policies and the plurality of controls include at least one of the following:

performing one of creating and modifying of the plurality of host ports for limiting a specified at least one I/O port to the set allowed in a I/O port allowed mask, assigning at least one of the plurality of host ports to at least one of the plurality of volume groups, wherein the assignment of the at least one of the plurality of host ports is limited to the plurality of volume groups within a scope of access to a user resource scope in a user ID, and assigning the plurality of logical volumes to a plurality of volume group configuration objects, the assignment of the plurality of logical volumes is limited to the plurality of logical volumes within a scope of access to the user resource scope in the user ID.

8. The computer program product of claim 7, further including a seventh executable portion for adding a plurality of resource group attributes to a plurality of configuration objects to associate with a specific one of the plurality of resource groups, wherein an authority to manage and control the plurality of configuration objects is created for a user role with a user ID scope of access to the plurality of configuration objects is created with authority to manage and control the plurality of configuration objects.

9. The computer program product of claim 8, further including an eighth executable portion for configuring the user ID scope of access to include at least one of creating, deleting, and modifying the configuration of the plurality of configuration objects.

10. The computer program product of claim 7, further including a seventh executable portion for authorizing the administrator to create a tenant administrator identification (ID) having authority to configure a plurality of user IDs with a specific user role and limited to a user scope that is consistent with the user scope of a tenant administrator, wherein a tenant is adapted to configure the logical operator and the host attachment operator having authority to access a plurality of resources within a scope of the tenant.

11. The computer program product of claim 7, further including a seventh executable portion for creating and adding at least one I/O port allowed mask attribute by the plurality of resource groups.

12. The computer program product of claim 7, further including a seventh executable portion for configuring the logical operator to manage, control, and create a plurality of subordinate resource groups based upon a plurality of hierarchy rules for the plurality of resource groups and move a plurality of configuration objects between the plurality of resource groups to which the logical operator authority to access, the plurality of subordinate resource groups being a child of one of the plurality resource groups to which a user has authority to access.

* * * * *